United States Patent
Puiu

(10) Patent No.: US 6,991,080 B2
(45) Date of Patent: *Jan. 31, 2006

(54) POWER TRANSMISSION DEVICES WITH ACTIVE TORQUE COUPLINGS

(75) Inventor: Dumitru Puiu, Sterling Heights, MI (US)

(73) Assignee: Magna Powertrain, Inc., Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 11/151,778

(22) Filed: Jun. 14, 2005

(65) Prior Publication Data

US 2005/0230214 A1    Oct. 20, 2005

Related U.S. Application Data

(63) Continuation of application No. 10/771,664, filed on Feb. 4, 2004.

(51) Int. Cl.
*F16D 25/0638* (2006.01)
*B60K 17/35* (2006.01)

(52) U.S. Cl. .......... 192/35; 192/85 AA; 192/93 A; 180/249

(58) Field of Classification Search .......... 192/35, 192/70.23, 85 AA, 93 A; 180/249, 250; 475/86
See application file for complete search history.

(56) References Cited

U.S. PATENT DOCUMENTS

| | | | |
|---|---|---|---|
| 4,679,463 A | 7/1987 | Ozaki et al. |
| 4,862,769 A | 9/1989 | Koga et al. |
| 4,895,236 A | 1/1990 | Sakakibara et al. |
| 5,224,906 A | 7/1993 | Sturm |
| 5,366,421 A | 11/1994 | Hirota |
| 5,407,024 A | 4/1995 | Watson et al. |
| 5,423,235 A | 6/1995 | Botterill et al. |
| 6,183,387 B1 | 2/2001 | Yoshioka |
| 6,315,096 B1 | 11/2001 | Dairokuno et al. |
| 6,318,532 B1 | 11/2001 | Gassmann |
| 6,383,109 B1 | 5/2002 | Hofer |
| 6,397,702 B1 | 6/2002 | Yamada et al. |
| 6,422,365 B2 | 7/2002 | Arai et al. |
| 6,461,267 B1 | 10/2002 | Paielli |
| 6,478,708 B2 | 11/2002 | Krisher |
| 6,520,880 B1 | 2/2003 | Fukushima et al. |

(Continued)

FOREIGN PATENT DOCUMENTS

JP    62-18117    1/1990

(Continued)

*Primary Examiner*—Richard M. Lorence
(74) *Attorney, Agent, or Firm*—Harness, Dickey & Pierce P.L.C.

(57) ABSTRACT

A torque transfer mechanism having a multi-plate friction clutch connecting a pair of rotary members and a electro-hydraulic clutch actuator for controlling engagement of the friction clutch. The clutch actuator includes a hydraulic pump, a hydraulically actuated rotary operator, and a thrust mechanism. The hydraulic pump draws low pressure fluid from a sump and selectively delivers high pressure fluid to a series of actuation chambers and return chambers defined between coaxially aligned first and second components of the rotary operator. The magnitude of the fluid pressure delivered to the actuation chamber controls angular movement of the second component relative to the first component for energizing the thrust mechanism. The thrust mechanism applies a clutch engagement force on the friction clutch, thereby transferring drive torque from the first rotary member to the second rotary member. An electrohydraulic control system regulates the fluid pressure delivered to the actuation and return chambers.

42 Claims, 16 Drawing Sheets

U.S. PATENT DOCUMENTS

| | | |
|---|---|---|
| 6,544,136 B2 | 4/2003 | Duan |
| 6,595,338 B2 | 7/2003 | Bansbach et al. |
| 6,681,913 B2 | 1/2004 | Lee |
| 6,745,879 B1 | 6/2004 | Dolan |
| 2001/0011622 A1 | 8/2001 | Arai et al. |
| 2005/0167224 A1 * | 8/2005 | Puiu .......................... 192/35 |

FOREIGN PATENT DOCUMENTS

| | | |
|---|---|---|
| JP | 63-66927 | 3/1990 |

* cited by examiner

POWER TRANSMISSION DEVICES WITH ACTIVE TORQUE COUPLINGS

CROSS-REFERENCE TO RELATED APPLICATIONS

This application is a continuation of U.S. patent application Ser. No. 10/771,664 filed on Feb. 4, 2004.

The present invention relates generally to power transfer systems for controlling the distribution of drive torque between the front and rear drivelines of a four-wheel drive vehicle and/or the left and right wheels of an axle assembly. More particularly, the present invention is directed to a power transmission device for use in motor vehicle driveline applications having a torque transfer mechanism equipped with a clutch actuator that is operable for controlling actuation of a multi-plate friction clutch.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism can include a dog-type lock-up clutch that can be selectively engaged for rigidly coupling the secondary driveline to the primary driveline to establish a "part-time" four-wheel drive mode. When the lock-up clutch is released, drive torque is only delivered to the primary driveline for establishing a two-wheel drive mode.

A modern trend in four-wheel drive motor vehicles is to equip the power transmission device with an adaptively controlled transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch assembly. The clutch actuator can be a power-operated device that is actuated in response to electric control signals sent from an electronic controller unit (ECU). The electric control signals are typically based on changes in current operating characteristics of the vehicle (i.e., vehicle speed, interaxle speed difference, acceleration, steering angle, etc.) as detected by various sensors. Thus, such "on-demand" transfer clutch can utilize adaptive control schemes for automatically controlling torque distribution during all types of driving and road conditions. Such adaptively controlled transfer clutches can also be used in association with a center differential operably installed between the primary and secondary drivelines for automatically controlling interaxle slip and torque biasing in a full-time four-wheel drive application.

A large number of adaptively controlled transfer clutches have been developed with an electromechanical clutch actuator that can regulate the amount of drive torque transferred to the secondary driveline as a function of the electric control signal applied thereto. In some applications, the transfer clutch employs an electromagnetic clutch as the power-operated clutch actuator. For example, U.S. Pat. No. 5,407,024 discloses a electromagnetic coil that is incrementally activated to control movement of a ball-ramp drive assembly for applying a clutch engagement force to the multi-plate clutch assembly. Likewise, Japanese Laid-open Patent Application No. 62-18117 discloses a transfer clutch equipped with an electromagnetic clutch actuator for directly controlling actuation of the multi-plate clutch pack assembly. As an alternative, the transfer clutch can employ an electric motor and a mechanical drive assembly as the power-operated clutch actuator. For example, U.S. Pat. No. 5,323,871 discloses a transfer clutch equipped with an electric motor that controls rotation of a sector plate which, in turn, controls pivotal movement of a lever arm that is operable for applying the clutch engagement force to the multi-plate clutch assembly. Likewise, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer clutch having an electric motor which drives a reduction gearset for controlling movement of a ball screw operator and a ball-ramp operator which, in turn, apply the clutch engagement force to the clutch assembly.

In contrast to the electromechanical clutch actuators discussed previously, it is also well known to equip the transfer clutch with an electro-hydraulic clutch actuator. For example, U.S. Pat. Nos. 4,862,769 and 5,224,906 generally disclose use of an electric motor or solenoid to control the fluid pressure exerted by an apply piston on a multi-plate clutch assembly. In addition, U.S. Pat. No. 6,520,880 discloses a hydraulic actuation system for controlling the fluid pressure supplied to a hydraulic motor arranged which is associated with a differential gear mechanism in a drive axle assembly.

While many adaptive clutch actuation systems similar to those described above are currently used in four-wheel drive vehicles, a need exists to advance the technology and address recognized system limitations. For example, the size and weight of the friction clutch components and the electrical power requirements of the clutch actuator needed to provide the large clutch engagement loads make many systems cost prohibitive for use in most four-wheel drive vehicle applications. In an effort to address these concerns, new technologies are being developed for use in power-operated clutch actuator applications.

SUMMARY OF THE INVENTION

Thus, its is an objective of the present invention to provide a power transmission device for use in a motor vehicle having a torque transfer mechanism equipped with a unique electrohydraulically-operated clutch actuator that is operable to control adaptive engagement of a multi-plate clutch assembly.

As a related objective of the present invention, the torque transfer mechanism is well-suited for use in motor vehicle driveline applications to adaptively control the transfer of drive torque between first and second rotary members.

According to each preferred embodiment of the present invention, a torque transfer mechanism and an electrohydraulic control system are disclosed for adaptively controlling the transfer of drive torque between first and second rotary members in a power transmission device of the type used in motor vehicle driveline applications. The torque transfer mechanism includes a multi-plate friction clutch that is operably disposed between the first and second rotary members, and a clutch actuator that is operable for generating and applying a clutch engagement force on the friction clutch. The clutch actuator includes a rotary operator and a thrust mechanism. The electrohydraulic control system functions to deliver pressurized fluid to a plurality of actuation chambers defined between coaxially aligned first and second components of the rotary operator. During operation, the magnitude of the fluid pressure delivered to the actuation chambers controls the angular movement of the second component relative to the first component. Such relative angular movement controls actuation of the thrust mechanism for controlling the magnitude of the compressive clutch engagement force applied to the friction clutch, thereby controlling the transfer of drive torque from the first rotary member to the second rotary member.

According to another feature of the present invention, the electrohydraulic control system includes an electric motor for driving a fluid pump, vehicle sensors for detecting various operating characteristics of the motor vehicle, and an electronic control unit (ECU) for receiving input signals from the vehicle sensors. The ECU controls actuation of the motor and one or more control valves for adaptively controlling the fluid pressure supplied to the actuation chambers. In addition, a pressure sensor provides a pressure signal to the ECU that is indicative of the fluid pressure in the actuation chambers.

According to yet another feature of the present invention, the first and second components of the rotary operator further define a plurality of return chambers that are located between the actuation chambers. In operation, a control valve is operable for selectively supplying hydraulic fluid to either the actuation chambers or the return chambers to precisely control relative angular movement between the first and second components of the rotary operator.

The torque transfer mechanism of the present invention is well-suited for use in a power transmission device for adaptively controlling the drive torque transferred between a primary driveline and a secondary driveline. According to one preferred application, the power transmission device of the transfer case with the torque transfer mechanism arranged torque transfer between the primary and secondary drivelines. the power transmission device is a power take-off unit or a drive axle assembly with the torque transfer mechanism arranged to provide on-demand torque transfer from the primary driveline to the secondary driveline. According to yet another preferred application, the power transmission device is a drive axle assembly with the torque transfer mechanism arranged to control speed differentiation and torque distribution across a differential unit.

BRIEF DESCRIPTION OF THE DRAWINGS

Further objectives, features and advantages of the present invention will become apparent to those skilled in the art from analysis of the following written description, the appended claims, and the accompanying drawings in which:

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in power transmission devices for use in motor vehicle drivelines such as, for example, a torque transfer clutch in a transfer case, a power take-off unit or an in-line torque coupling, a torque biasing clutch associated with a differential unit in full-time transfer cases or power take-off unit or in a drive axle assembly, or any other possible torque transfer application. Thus, while the present invention is hereinafter described in association with particular power transmission devices for use in specific driveline applications, it will be understood that the arrangements shown and described are merely intended to illustrate embodiments of the present invention.

Figure 1:
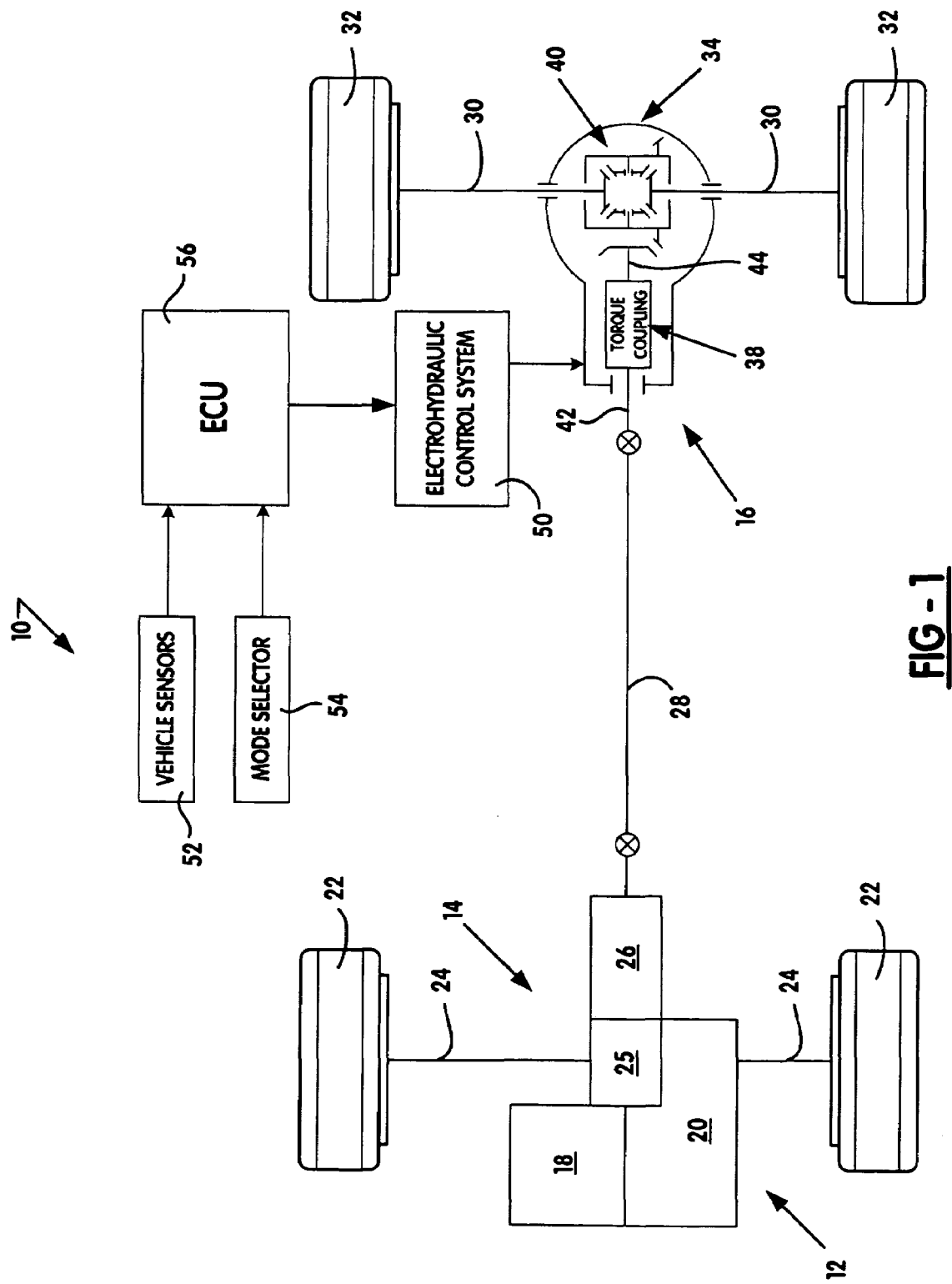
FIG. 1 illustrates the drivetrain of a four-wheel drive vehicle equipped with a power transmission device according to the present invention.

With reference to FIG. 1, a schematic layout of a vehicular drivetrain 10 is shown to include a powertrain 12, a first or primary driveline 14 driven by powertrain 12, and a second or secondary driveline 16. Powertrain 12 includes an engine 18 and a multi-speed transaxle 20 arranged to normally provide motive power (i.e., drive torque) to a pair of first wheels 22 associated with primary driveline 14. Primary driveline 14 further includes a pair of axleshafts 24 connecting wheels 22 to a differential unit 25 associated with transaxle 20. Secondary driveline 16 includes a power take-off unit (PTU) 26 driven by the output of transaxle 20, a propshaft 28 driven by PTU 26, a pair of axleshafts 30 connected to a pair of second wheels 32, and a drive axle assembly 34 that is operable to selectively transfer drive torque from propshaft 28 to axle halfshafts 30.

Drive axle assembly 34 is a power transmission device according to one preferred embodiment of the present invention. In particular, drive axle assembly 34 is shown schematically in FIG. 2 to include a housing assembly 36 which encloses a torque transfer mechanism 38 and a differential unit 40. Torque transfer mechanism 38 functions to selectively transfer drive torque from propshaft 28 to an input component of differential unit 40. Specifically, the torque transfer mechanism, hereinafter referred to as torque coupling 38, includes an input shaft 42 driven by propshaft 28, a pinion shaft 44, a transfer clutch 46 operably connected between input shaft 42 and pinion shaft 44, and a clutch actuator 48 for engaging transfer clutch 46.

With continued reference to the drawings, drivetrain 10 is shown to further include an electronically-controlled power transfer system for permitting a vehicle operator to select between a two-wheel drive mode, a locked ("part-time") four-wheel drive mode, and an adaptive ("on-demand") four-wheel drive mode. In this regard, transfer clutch 46 can be selectively engaged for transferring drive torque from input shaft 42 to pinion shaft 44 for establishing both of the part-time and on-demand four-wheel drive modes. The power transfer system includes an electrohydraulic control system 50 for selectively actuating clutch actuator 48, vehicle sensors 52 for detecting certain dynamic and operational characteristics of the motor vehicle, a mode select mechanism 54 for permitting the vehicle operator to select one of the available drive modes, and an electronic control unit (ECU) 56 for controlling operation of the components associated with electrohydraulic control system 50 which, in turn, controls actuation of clutch actuator 48 in response to input signals from vehicle sensors 52 and mode selector 54.

Figure 2:
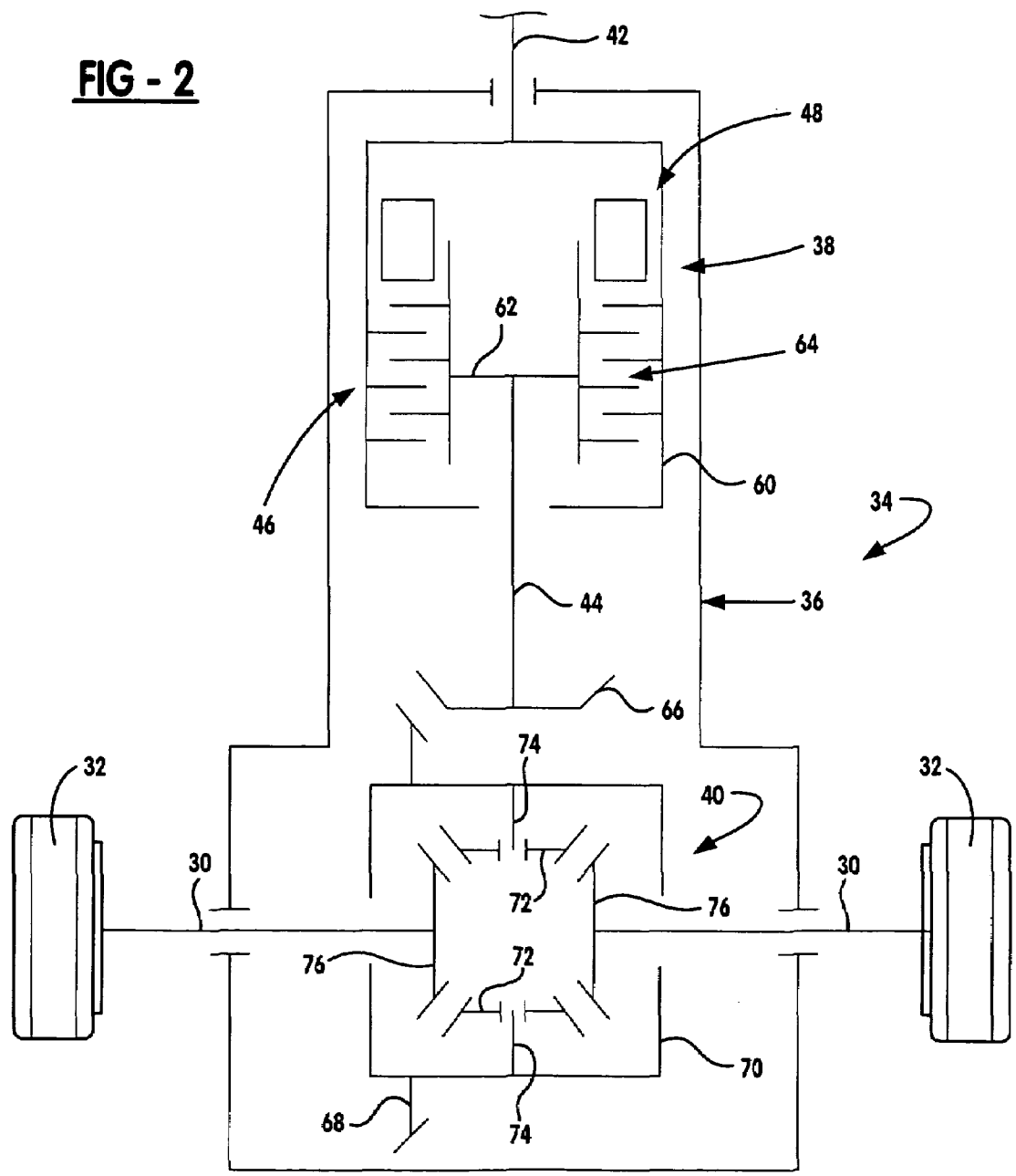
FIG. 2 is a schematic illustration of the power transmission device equipped with a torque transfer mechanism embodying the inventive concepts of the present invention.
Figure 3:
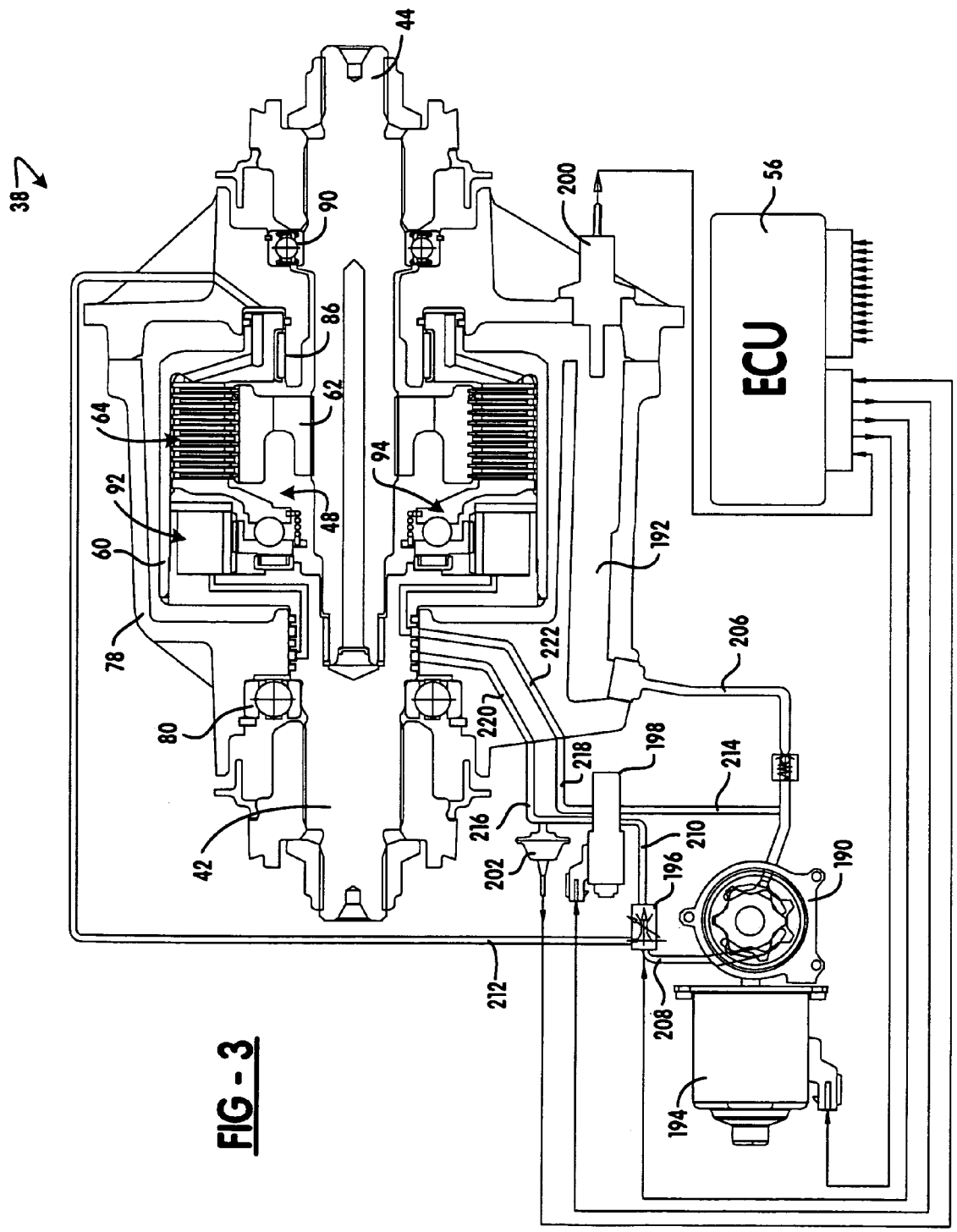
FIGS. 3 and 3A are sectional views of the torque transfer mechanism constructed in accordance with a preferred embodiment of the present invention.

Referring primarily to FIGS. 2 and 3, transfer clutch 46 generally includes a first clutch member 60 driven by input shaft 42, a second clutch member 62 driving pinion shaft 44, and a multi-plate clutch pack 64 of alternately interleaved clutch plates installed between input shaft 42 and pinion shaft 44. As shown in this particular arrangement, first clutch member 60 is a clutch drum fixed for rotation with input shaft 42 and second clutch member 62 is a clutch hub fixed (i.e., splined) for rotation with pinion shaft 44. Pinion shaft 44 drives a pinion gear 66 meshed with a ring gear 68 which, in turn, drives differential unit 40. Differential unit 40 includes a carrier 70 driven by ring gear 68, a pair of pinion gears 72 rotatably supported on pinion posts 74 fixed to carrier 70, and a pair of side gears 76. Side gears 76 are meshed with both pinion gears 74 and are coupled for rotation with a corresponding one of axleshafts 30.

Figure 3A:
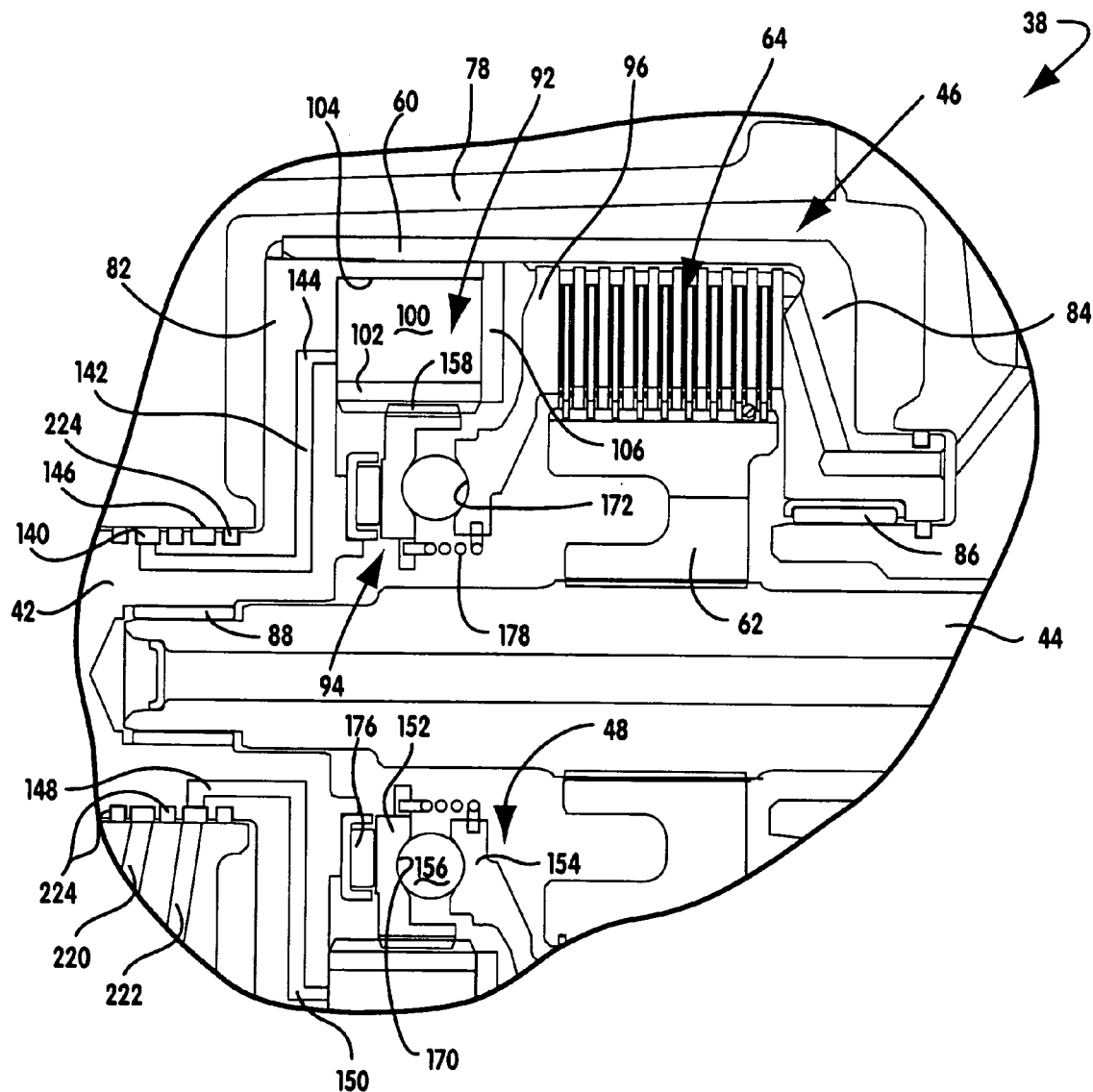

Referring now to FIGS. 3 and 3A, a preferred construction for torque coupling 38 will now be described in greater detail. Torque coupling 38 includes a case assembly 78 that is mounted in or forms part of housing 36 of drive axle assembly 34. A bearing assembly 80 supports input shaft 42 for rotation relative to case assembly 78. In addition, input shaft 42 is shown to include an integral end plate 82 that is rigidly secured (i.e., welded) to clutch drum 60. An end plate segment 84 of drum 60 is rotatively supported by a bearing assembly 86 from case assembly 78. Pinion shaft 44 has a first end rotatably supported by a bushing or bearing assembly 88 in a central bore formed in input shaft 42 while its second end extends out of end plate segment 84 of drum 60 and is rotatably supported from case assembly 78 by a bearing assembly 90. Clutch actuator 48 generally includes a rotary operator 92, a thrust mechanism 94, and an apply plate 96. Apply plate 96 is secured (i.e., splined) for rotation with drum 60 of transfer clutch 46.

As will be detailed, clutch actuator 48 is operable for generating and exerting a compressive clutch engagement force on clutch pack 64. Such engagement of clutch pack 64 causes rotary power ("drive torque") to be transferred from input shaft 42 to pinion shaft 44. Specifically, clutch actuator 48 is operable for controlling axial movement of apply plate 96 and thus, the magnitude of the clutch engagement force applied to clutch pack 64. In particular, apply plate 96 is axially moveable relative to clutch pack 64 between a first or "released" position and a second or "locked" position. With apply plate 96 in its released position, a minimum clutch engagement force is exerted on clutch pack 64 such that virtually no drive torque is transferred from input shaft 42 through transfer clutch 46 to pinion shaft 44, thereby establishing the two-wheel drive mode. In contrast, movement of apply plate 96 to its locked position causes a maximum clutch engagement force to be applied to clutch pack 64 such that pinion shaft 44 is, in effect, coupled for common rotation with input shaft 42, thereby establishing part-time four-wheel drive mode. Accordingly, controlling the position of apply plate 96 between its released and locked positions permits adaptive regulation of the amount of drive torque transferred from input shaft 42 to pinion shaft 44, thereby establishing the on-demand four-wheel drive mode.

Rotary operator 92 includes a first or reaction ring 100 that is concentrically aligned with a second or "actuator" ring 102. The rings are retained in an annular chamber for 104 defined between end plate 82 and a retainer plate 106. While not shown, retainer plate 106 is secured by a plurality of bolts to end plate 82 which also extend through mounting holes 108 in reaction ring 100. As such, reaction ring 100 is fixed for common rotation with input shaft 42.

Figure 4:
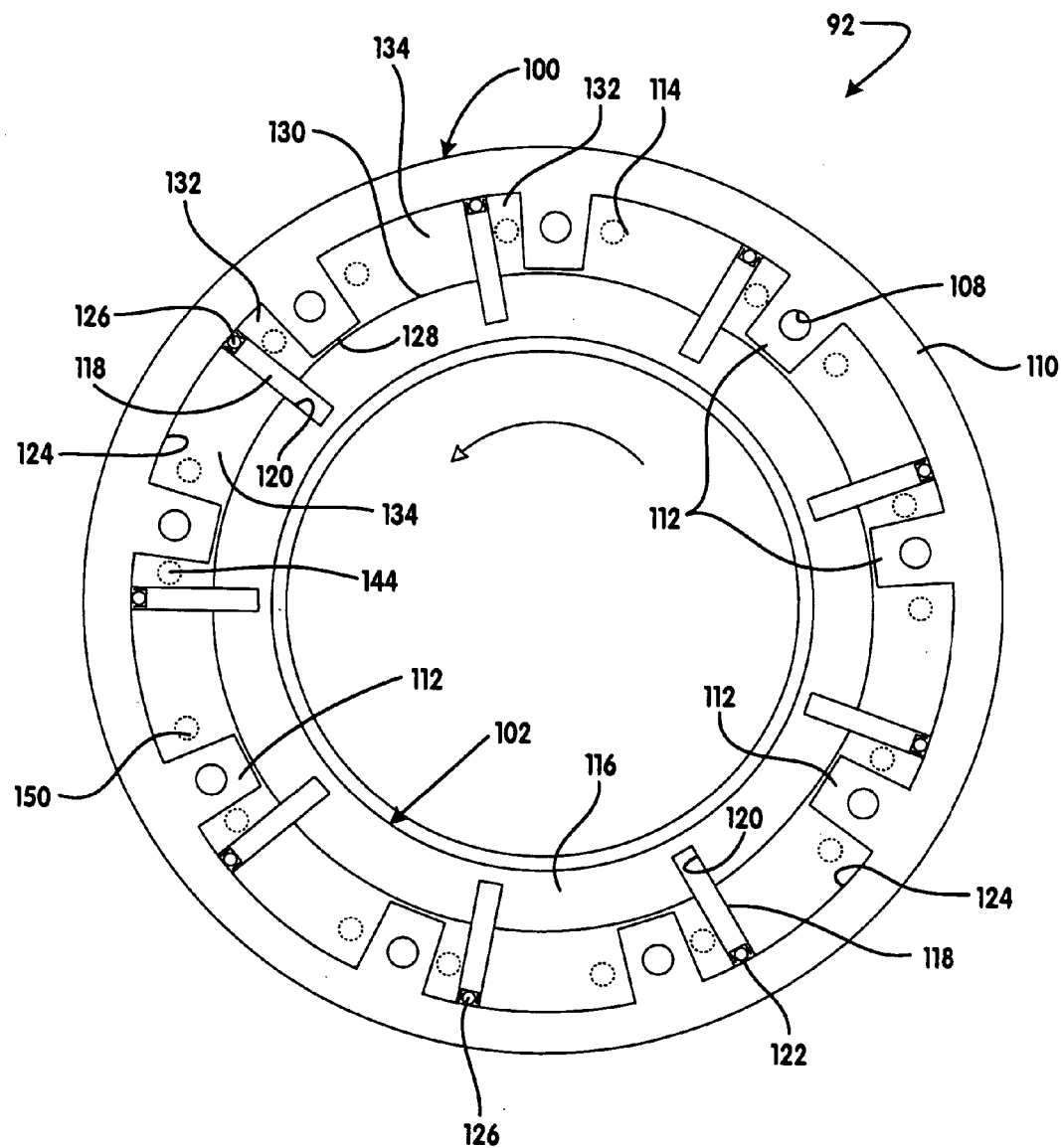
FIG. 4 is a sectional view of the rotary operator associated with the torque transfer mechanism shown in FIGS. 3 and 3A.

As best seen from FIG. 4, reaction ring 100 includes a cylindrical body segment 110 and a plurality of radially inwardly projecting lugs 112 which define a complimentary number of longitudinally extending channels 114 therebetween. Likewise, actuator ring 102 has a cylindrical body segment 116 and a plurality of separator plates 118 that are retained in longitudinal slots 120 formed in body segment 116. An outer edge surface 122 of each separator plate 118 is aligned to be in sliding engagement with an inner wall surface 124 of channels 114. A seal strip 126 may be attached to edge surface 122 to provide a sliding fluid-tight interface between separator plates 118 and body segment 110 of reaction ring 100. Likewise, a terminal edge surface 128 of each lug 112 is aligned to be in sliding engagement with an outer wall surface 130 of actuator ring 102. Each separator plate 118 defines an actuation chamber 132 and a return chamber 134 between adjacent pairs of lugs 112. As such, a plurality of circumferentially-spaced alternating actuation chambers 132 and return chambers 134 are established in association with rotary operator 92.

To provide means for supplying hydraulic fluid from electrohydraulic control system 50 to actuation chambers 132, a first flow path is formed in input shaft 42 and its end plate segment 82. The first flow passage includes an annular chamber 140 which communicates with a series of circumferentially-spaced flow passages 142 having ports 144 in fluid communication with actuation chambers 132. Similarly, a second flow path provides means for supplying hydraulic fluid from control system 50 to return chambers 134. This second flow path includes an annular chamber 146 which communicates with a series of circumferentially-spaced flow passages 148 having ports 150 in fluid communication with return chambers 134. As will be detailed, increasing the fluid pressure delivered through ports 144 to actuation chambers 132 while decreasing the fluid pressure delivered through ports 150 to return chambers 134 causes actuator ring 102 to move (i.e., index) in a first rotary direction (i.e., counterclockwise) relative to reaction ring 100 for causing thrust mechanism 94 to urge apply plate 96 to move toward its locked position. In contrast, decreasing the fluid pressure in actuation chambers 132 and increasing the fluid pressure in return chambers 134 causes actuator ring 102 to index in a second rotary direction (i.e., clockwise) relative to reaction ring 100 for causing thrust mechanism 94 to permit apply plate 96 to move toward its released position.

With continued reference primarily to FIG. 3A, thrust mechanism 94 is shown to be a ball ramp unit having a first cam member 152, a second cam member 154, and rollers, such as balls 156. First cam member 152 is fixed via a spline connection 158 for rotary movement with actuator ring 102. Likewise, second cam member 154 is fixed to apply plate 96 for common rotation with drum 60 and input shaft 42. Each ball 156 is disposed in a cam channel defined between a cam track 170 formed in first cam member 152 and a corresponding cam track 172 formed in second cam member 154. Preferably, a plurality of cam channels are provided between first cam member 152 and second cam member 154 with cam tracks 170 and 172 configured as oblique sections of a helical torus. However, balls 156 and cam tracks 170 and 172 may be replaced with alternative cam components and/or ramp configurations that function to cause axial displacement of second cam member 154. In any arrangement, the load transferring components can not be self-locking or self-engaging so as to permit fine control of the translational movement of apply plate 96 (via second cam member 154) for precise control of the engagement characteristics (i.e., torque transfer) of transfer clutch 46. As seen, a thrust bearing 176 is located between end plate 82 and first cam member 152.

Ball ramp unit 94 further includes a torsional return spring 178 that is operably disposed between cam members 152 and 154. Return spring 178 functions to angularly bias cam members 152 and 154 to return to a "retracted" position for de energizing ball ramp unit 94. Such angular movement of the cam members to the retracted position due to the biasing of return spring 178 results in angular movement of actuator ring 102 relative to reaction ring 102 in the second angular direction toward a first or "low pressure" position and translational movement of apply plate 96 toward its released position. With actuator ring 102 in its low pressure position (as shown in FIG. 4), ball ramp unit 94 is de-energized and apply plate 96 is in its released position so as to exert a predetermined minimum clutch engagement force on clutch pack 64 for releasing engagement of transfer clutch 46.

Electrohydraulic control system 50 is operable to supply high pressure fluid to actuation chambers 132 for causing actuator ring 102 to rotate relative to reaction ring 100 in the first direction from its low pressure position toward a second or "high pressure" position. Such movement of actuator ring 102 results in corresponding relative angular movement between cam members 152 and 154 from the retracted position toward a second or "extended" position for energizing ball ramp unit 94. Accordingly, the profile of cam tracks 170 and 172 establishes the resultant amount of translational movement of second cam member 154 required to cause corresponding axial movement of apply plate 96 from its released position toward its locked position. When actuator ring 102 is in its high pressure position, ball ramp unit 94 is fully energized and apply plate 96 is located in its locked position such that the maximum clutch engagement force is exerted on clutch pack 64 for fully engaging transfer clutch 46. Furthermore, electrohydraulic control system 50 is operable to supply high pressure fluid to return chambers 134 and vent actuation chambers 132 for causing actuator ring 102 to rotate relative to reaction ring 100 in the second direction from its high pressure position. Such angular movement of actuator ring 102 results in corresponding relative angular movement between cam members 152 and 154 from the extended position toward the retracted position for releasing ball ramp unit 94. As such, apply plate 96 is caused to move from its locked position toward its released position for releasing engagement of transfer clutch 46.

With apply plate 96 in its released position, virtually no drive torque is transferred from input shaft 42 to pinion shaft 44 through torque coupling 38 so as to effectively establish the two-wheel drive mode. In contrast, location of apply plate 96 in its locked position results in a maximum amount of drive torque being transferred to pinion shaft 44 for coupling pinion shaft 44 for common rotation with input shaft 42, thereby establishing the part-time four-wheel drive mode. Accordingly, controlling the position of apply plate 96 between its released and locked positions permits variable control of the amount of drive torque transferred from input shaft 42 to pinion shaft 44 for establishing an on-demand four-wheel drive mode. Thus, the magnitude of the fluid pressure supplied to actuation chambers 132 and return chambers 134 controls the angular position of actuator ring 102 relative to reaction ring 100, thereby controlling actuation of ball ramp unit 94 and the resulting movement of apply plate 96 between its released and locked positions.

Figure 5:
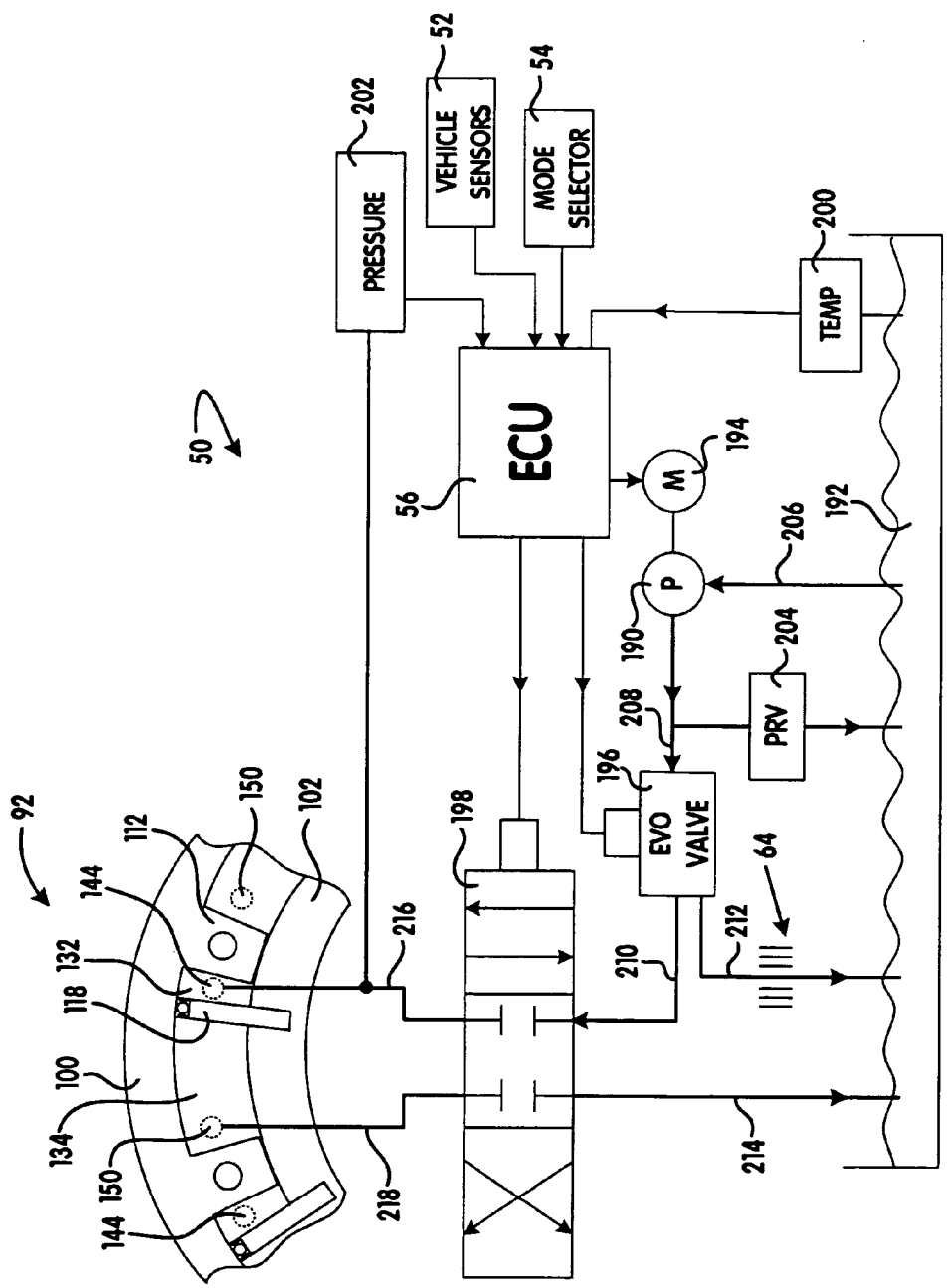
FIG. 5 is a schematic diagram of the electrohydraulic control circuit associated with the torque transfer mechanism of the present invention.

Referring to FIGS. 3 and 5, the components associated with electrohydraulic control system 50 will now be described. The basic components of control system 50 include a fluid pump 190 operable to draw fluid from a fluid source or sump 192 within casing 78, an electric motor 194 driving pump 190, an electronic variable orifice (EVO) valve 196, and a directional control valve 198. Control system 50 further includes a temperature sensor 200, a pressure sensor 202 and a spring-type pressure relief valve (PRV) 204. Motor 194 is a low power unit operable for causing pump 190 to draw fluid from sump 192 through a first flow path 206. The magnitude of the line pressure discharged from pump 190 is delivered to an inlet of EVO valve 196 through a second flow path 208. However, PRV 204 functions to limit the line pressure delivered to the inlet of EVO valve 196 to a predefined maximum fluid pressure value. EVO valve 196 includes a moveable valve element that functions to vary the line pressure to a "control" pressure value that is supplied from an outlet of EVO valve 196 to an inlet of control valve 198 via a third flow path 210. As seen, the low pressure fluid by-passed through EVO valve 196 flows through a fourth flow path 212 and is used to cool and lubricate clutch pack 64. Fluid discharged from control valve 198 is returned via a fifth flow path 214 to sump 192. Finally, control valve 198 is shown to be in fluid communication with actuation chambers 132 via a sixth flow path 216 and in fluid communication with return chambers 134 via a seventh flow path 218. It will be appreciated that the components of the electrohydraulic control system can be integrated into case assembly 78 to define a stand-alone assembly or, in the alternative, be remotely located and connected via suitable hoses and tubing.

Rotary operator 92 is partially shown in FIG. 5 to illustrate its hydraulic connections with control valve 198. In the arrangement shown, EVO valve 196 is preferably an electromagnetic flow control valve that is capable of variably regulating the fluid pressure delivered to control valve 198.

Likewise, control valve 198 is shown as a 3-position shuttle valve. As seen, ECU 56 is operable to send electrical control signals to electric motor 194, EVO valve 196 and control valve 198. EVO valve 196 is selectively actuated by ECU 56 to control the fluid pressure supplied to third flow path 210 while control valve 198 is selectively actuated to control delivery of the pressurized fluid to either of actuation chambers 132 or return chambers 134. As best seen from FIGS. 3 and 3A, sixth flow path 216 is in fluid communication with annular chamber 140 via a flow passage 220 formed in case 78 while seventh flow path 218 communicates with annular chamber 146 via another flow passage 222. A plurality of ring seals 224 are provided between case 78 and input shaft 42 to delimit chambers 140 and 146.

As contemplated by the present invention, ECU 56 is programmed to accurately control the angular position of actuator ring 102 relative to reaction ring 100 based on a predefined control strategy for transferring the desired amount of drive torque across transfer clutch 46. The control strategy functions to determine and generate the electric control signals sent to EVO valve 196 and control valve 198 based on the mode signal from mode selector 54 and the sensor signals from sensors 52. In addition, pressure sensor 202 sends a signal to ECU 56 that is indicative of the fluid pressure delivered through sixth flow path 216 to actuation chambers 132. Likewise, temperature sensor 200 sends a signal to ECU 56 that is indicative of the fluid temperature in sump 192.

In operation, if the vehicle operator selects the two-wheel drive mode, EVO valve 196 is opened and control valve 198 is initially actuated to cause third flow path 210 to be placed in communication with seventh flow path 218 while sixth flow path 216 is placed in communication with fifth flow path 214, whereby actuation chambers 132 are vented to sump 192 while fluid at control pressure is supplied to return chambers 134. This results in actuator ring 102 being forced to its low pressure position relative to reaction ring 100 for releasing engagement of transfer clutch 46. Thereafter, control valve 198 can be shifted into its closed position with no fluid delivered to actuation chambers 132 or return chambers 134 since return spring 178 forcibly biases actuator ring 102 to remain in its low pressure position. In contrast, upon selection of the part-time four-wheel drive mode, EVO valve 196 is opened and control valve 198 is actuated to connect third flow path 210 to sixth flow path 216 and also connect seventh flow path 218 to fifth flow path 214, whereby actuation chambers 132 are supplied with fluid at control pressure and return chambers 134 are vented to sump 192. The high pressure fluid supplied to actuation chambers 132 causes actuator ring 102 to move to its high pressure position relative to reaction ring 100, whereby ball ramp unit 94 is fully energized for moving apply plate 96 to its locked position for fully engaging transfer clutch 46. PRV 204 functions to limit the maximum fluid pressure that can be delivered to actuation chambers 132 during part-time four-wheel drive operation, thereby providing a torque limiting feature to prevent damage to clutch pack 64.

When mode selector 54 indicates selection of the on-demand four-wheel drive mode, ECU 56 actuates control valve 198 so as to connect third flow path 210 to sixth flow path 216 while also connecting seventh flow path 218 to fifth flow path 214. As such, return chambers 134 are vented and supply actuation chambers 132 are supplied with pressurized fluid from EVO valve 196. ECU 56 functions to adaptively control EVO valve 196 so as to initially supply fluid at a predetermined relatively low pressure to actuation chambers 132 that causes actuator ring 102 to index slightly relative to reaction ring 100 in the first direction. This angular movements causes actuator ring 102 to move from its low pressure position to an intermediate or "ready" position which, in turn, results in ball ramp unit 94 moving apply plate 96 from its released position to a "stand-by" position. In the stand-by position, apply plate 96 exerts a small clutch engagement force on clutch pack 64. Accordingly, a small amount of drive torque is delivered to pinion shaft 44 through transfer clutch 46 in this adapt-ready condition. Thereafter, ECU 56 determines when and how much drive torque needs to be transferred to pinion shaft 44 based on the current tractive conditions and/or operating characteristics of the motor vehicle, as detected by sensors 52.

Sensors 52 detect such parameters as, for example, the rotary speed of the input and pinion shafts, the vehicle speed and/or acceleration, the transmission gear, the on/off status of the brakes, the steering angle, the road conditions, etc. Such sensor signals are used by ECU 56 to determine a desired output torque value utilizing a control logic scheme that is incorporated into ECU 56. In particular, the control logic correlates the desired torque value to a fluid pressure value to be delivered to actuation chambers 132. Based on this desired pressure value, ECU 56 actively controls actuation of EVO valve 196 to generate a corresponding pressure level in actuation chambers 132. Pressure sensor 202 provides ECU 56 with direct feedback as to the actual fluid pressure in actuation chambers 132 so as to permit precise control of clutch actuator 52.

In addition to adaptive on-demand torque control, the present invention permits automatic release of transfer clutch 46 in the event of an ABS braking condition or during the occurrence of an over-temperature condition. Specifically, when ECU 56 is signaled that an ABS brake condition occurs, control valve 198 is immediately actuated to connect return chambers 134 with EVO valve 196 while actuation chambers 132 are vented to sump 192. Also, EVO valve 196 is fully opened to send full pressure to return chambers 134, thereby forcibly moving actuator ring 102 in its second direction to its low pressure position for fully releasing transfer clutch 46. Moreover, if temperature sensor 200 detects that the fluid temperature in sump 192 exceeds a predetermined threshold value, the same type of immediate release of transfer clutch 46 will be commanded by ECU 56.

While the control scheme has been described based on an on-demand torque transfer strategy, it is contemplated that a differential "mimic" control strategy can likewise be used. Specifically, the torque distribution between input shaft 42 and pinion shaft 44 can be controlled to normally maintain a predetermined rear/front ratio (i.e., 70:30, 50:50, etc.) so as to simulate the inter-axle torque splitting feature typically provided by a center differential unit. This desired torque distribution can then be adaptively controlled to address lost traction at either set of wheels. Regardless of whether the control logic scheme is based on an on-demand or a differential torque transfer strategy, accurate control of the fluid pressure delivered to actuation chambers 132 of rotary operator 92 provides the desired torque transfer characteristics being established across transfer clutch 46.

Figure 6:
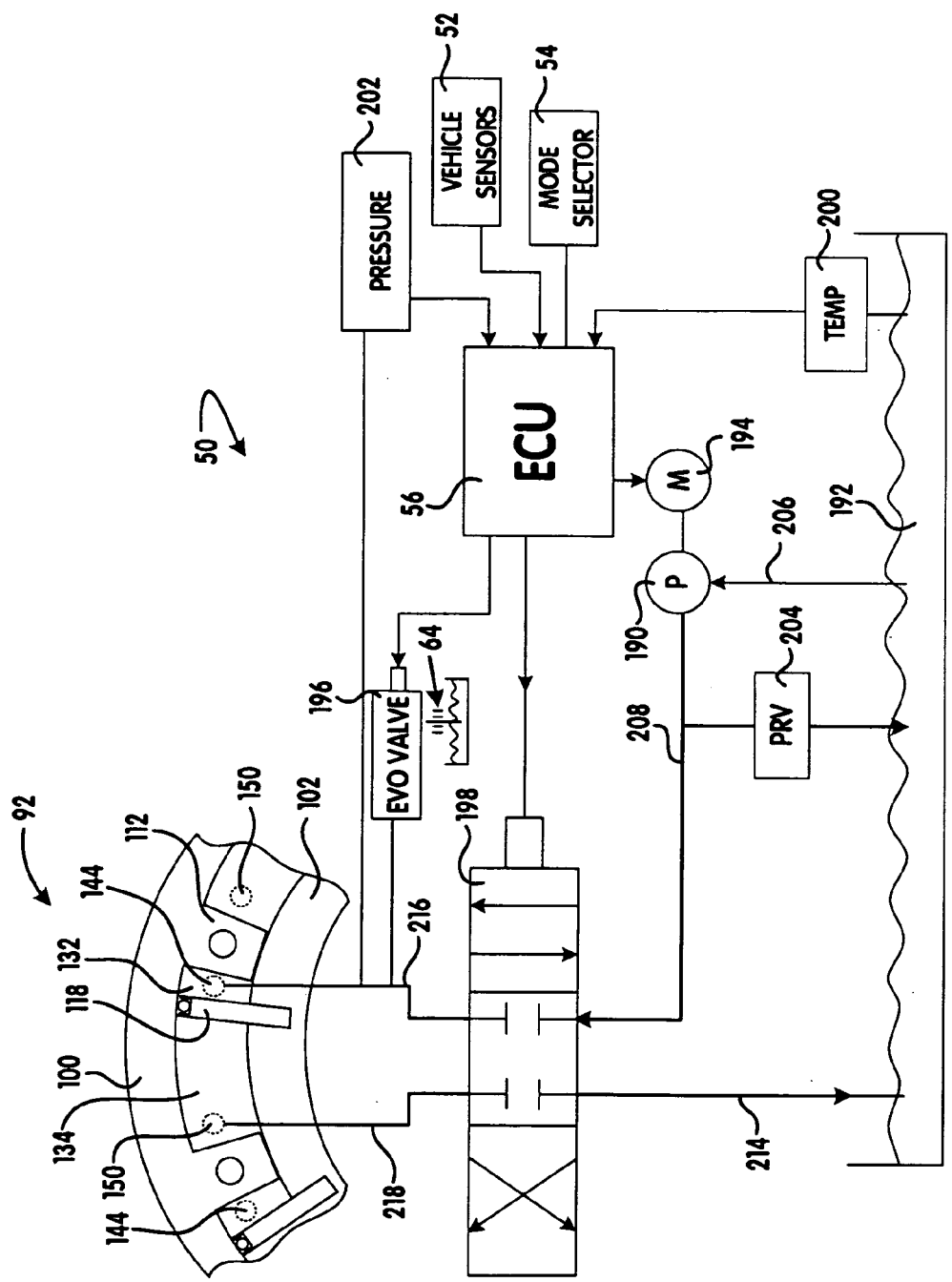
FIGS. 6 through 8 are schematic diagrams of alternative electrohydraulic control systems adapted for use with the torque transfer mechanism of the present invention.

It is contemplated that the 3-position directional control valve 198 shown in FIG. 5 could easily be substituted with a 2-position directional valve or any other known valve device capable of controlling the direction of flow in the hydraulic circuit. Likewise, FIG. 6 illustrates a modified arrangement for electrohydraulic control system 50 where control valve 198 now receives the line pressure directly from pump 190 via flow path 208 and EVO valve 196 is functional to regulate the fluid pressure within actuation chambers 132 by controlling the fluid pressure within flow path 216. Again, EVO valve 196 is normally open with the by-passed fluid delivered through flow path 212 to cool and lubricate clutch pack 64. In operation, the fluid pressure supplied to actuation chambers 132 is increased by closing EVO valve 196. As such, variable control of EVO valve 156 again results in variable pressure control within actuation chambers 132.

Figure 7:
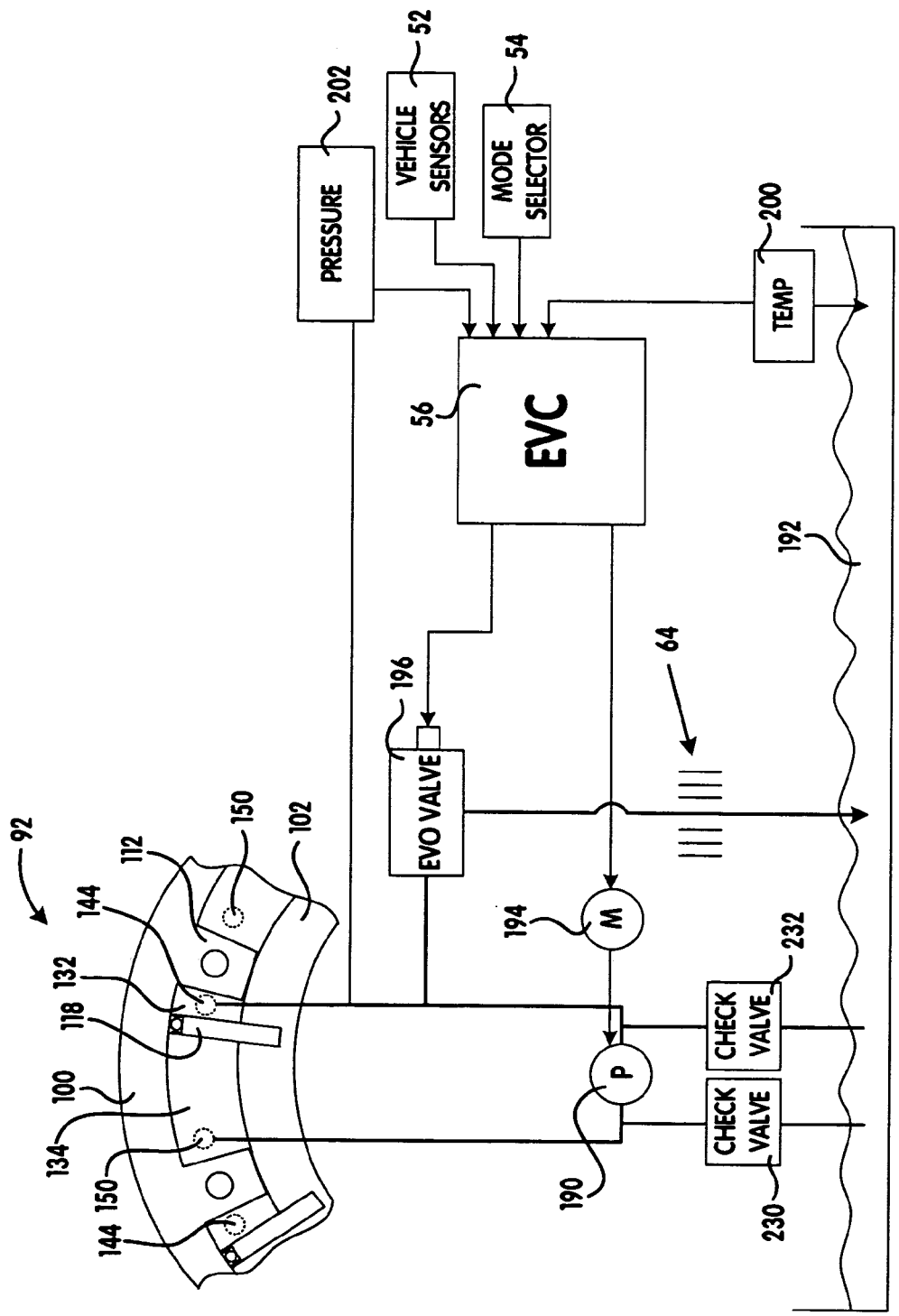

FIG. 7 is a hydraulic schematic of an electrohydraulic clutch system 50 which is generally similar to FIG. 6 except that control valve 198 has been eliminated. As such, ECU 56 controls the pumping direction of pump 190 by reversing the polarity of motor 194. Check valves 230 and 232 are provided to permit such a bi-directional pumping action. As before, the pressure profile of the fluid delivered to actuation chambers 132 is adaptively controlled via variable actuation of EVO valve 196. Optionally, EVO valve 196 can be eliminated with the pressure profile within actuation chambers 132 and return chambers 134 directly controlled by variable control of the rotary speed (RPM) and direction of electric motor 194.

Figure 8:
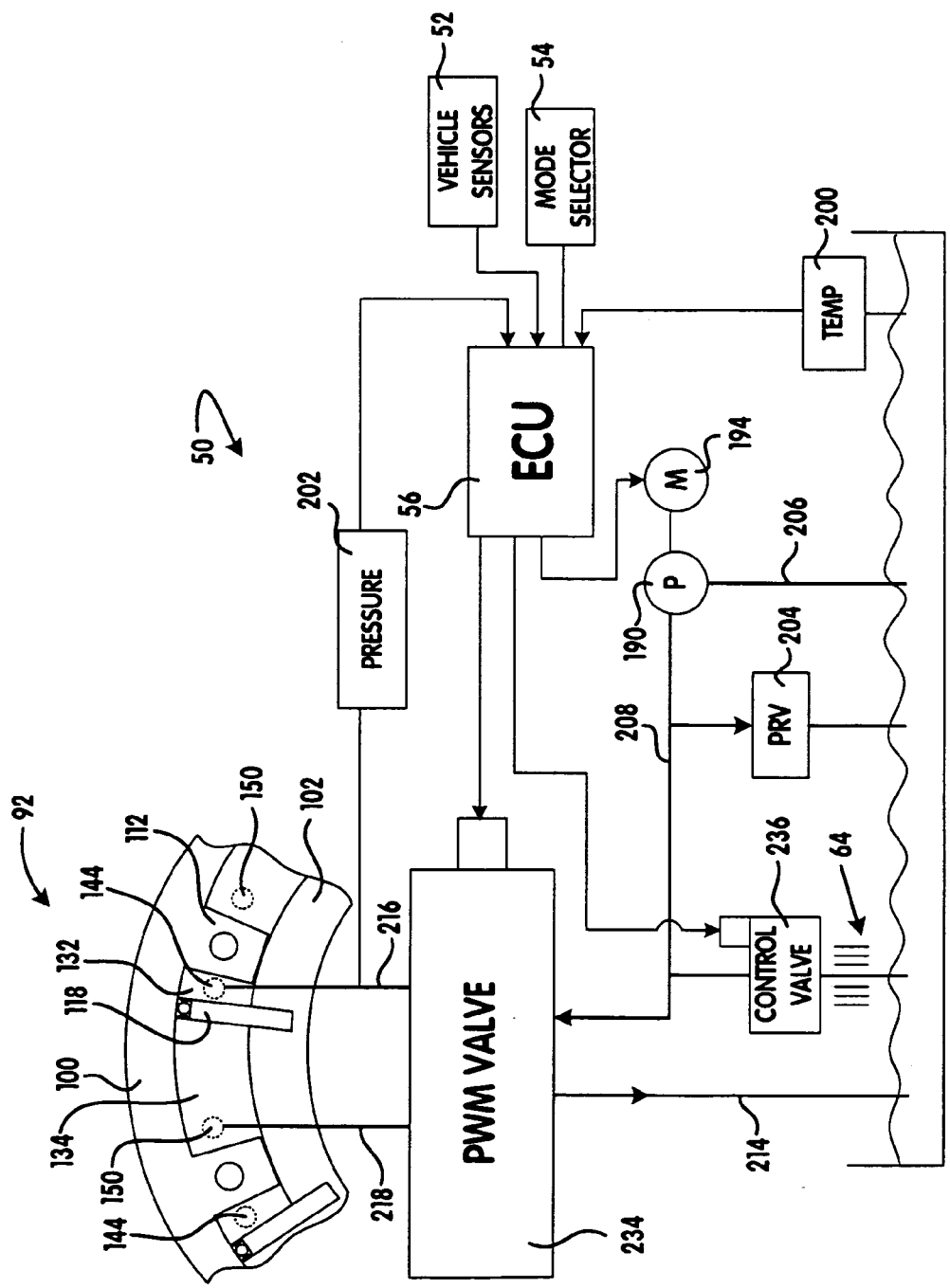

The previous hydraulic circuits utilized control valve 198 for directional control in conjunction with EVO valve 196 for adaptive pressure regulation. As an alternative, FIG. 8 illustrates a hydraulic circuit wherein a proportional control valve 234 is used to regulate both the directional and pressure characteristics. Preferably, proportional control valve 234 is a pulse width modulated (PWM) valve having a moveable element that is controlled by an electromagnetic solenoid based on electric control signals from ECU 56. In addition, a flow control valve 236 is provided in flow path 208 to prevent dead-heading of pump 190 and to provide cooling flow to clutch pack 64.

Figure 9:
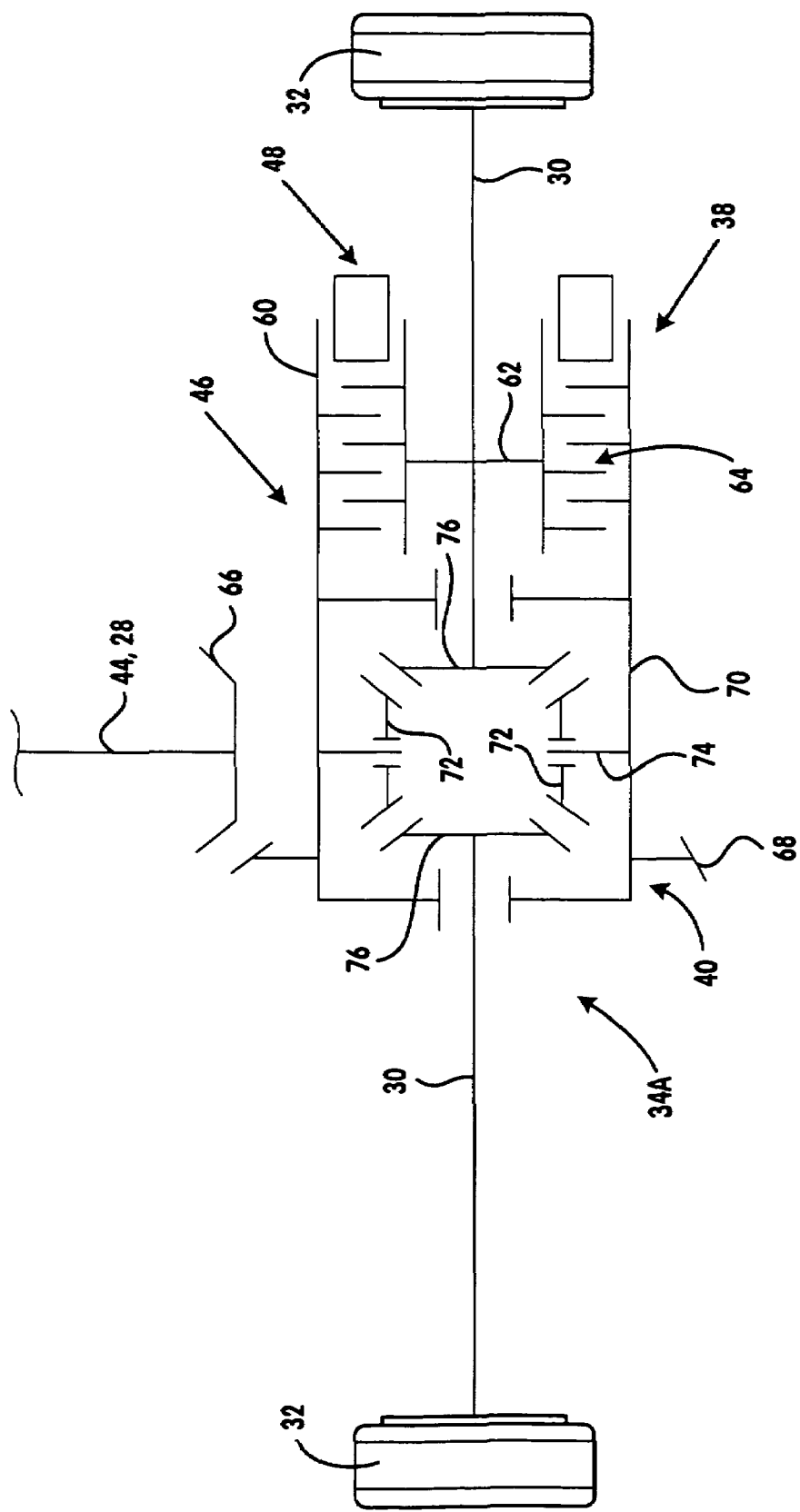
FIG. 9 is a schematic illustration of an alternative power transmission device available for use with the drivetrain shown in FIG. 1.

The arrangement shown for drive axle assembly 34 of FIG. 2 is operable to provide the on-demand four-wheel drive mode by adaptively transferring drive torque from primary driveline 14 (via propshaft 28) to secondary driveline (via pinion shaft 44). In contrast, a drive axle assembly 34A is now shown in FIG. 9 with torque coupling 38 now installed between differential case 70 and one of axleshafts 30 to provide an adaptive system for biasing the torque and limiting intra-axle slip between the rear wheels 32. As before, torque coupling 38 is schematically shown to include transfer clutch 46 and clutch actuator 48, the construction and function of which are understood to be similar to the detailed description previously provided herein for each sub-assembly. It will be understood that this particular "limited slip" differential arrangement can either be used in association with the on-demand drive axle assembly shown in FIG. 2 or in association with a drive axle assembly wherein propshaft 28 directly drives differential unit 40.

Figure 10:
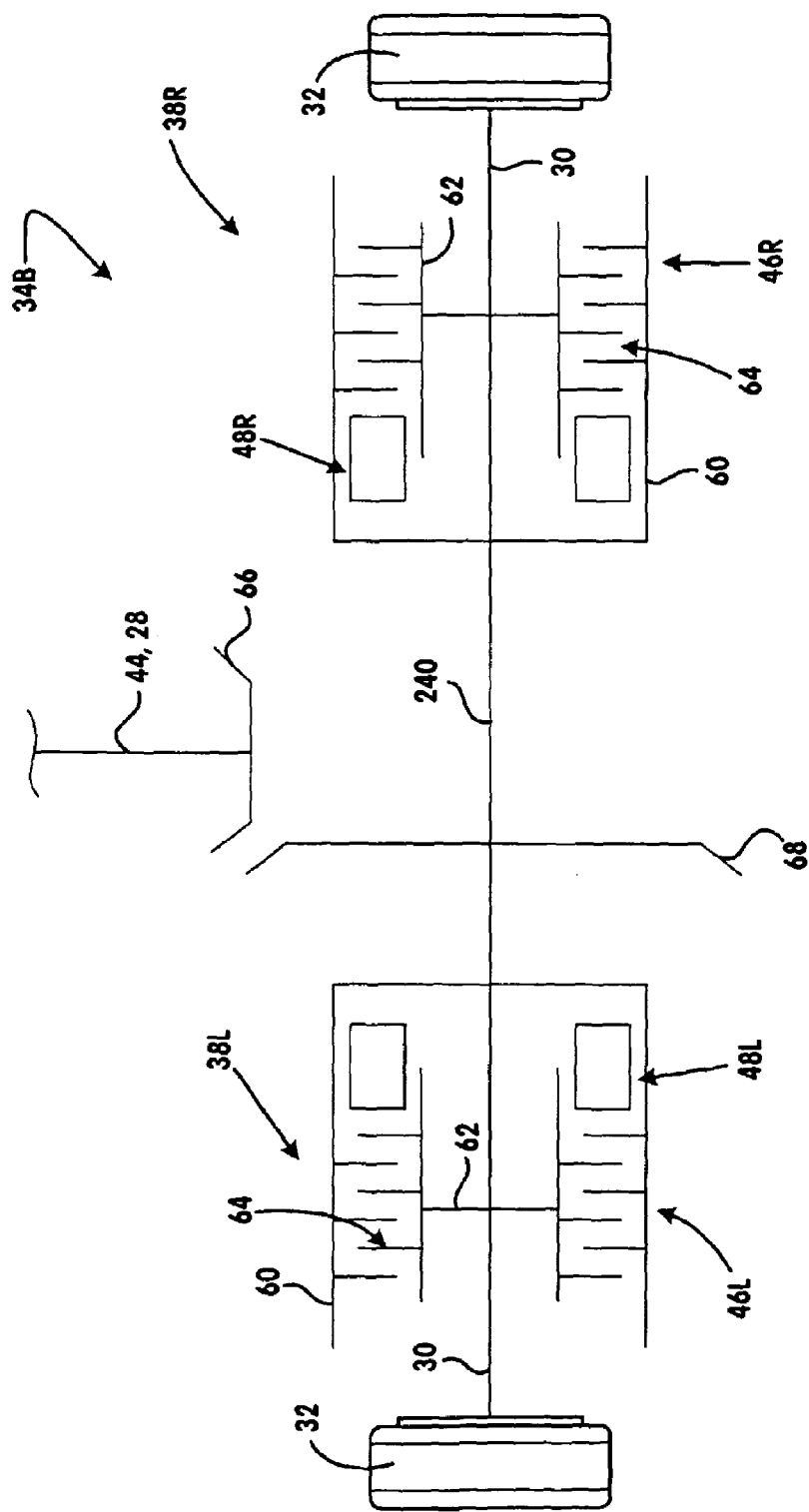
FIG. 10 is a schematic illustration of another alternative embodiment of a power transmission device according to the present invention.

Referring now to FIG. 10, a drive axle assembly 34B is schematically shown to include a pair of torque couplings 38L and 38R that are operably installed between a driven shaft 44 or 28 and axleshafts 30. The driven pinion shaft drives a right-angled gearset including pinion 66 and ring gear 68 which, in turn, drives a transfer shaft 240. First torque coupling 38L is shown disposed between transfer shaft 240 and the left axleshafts 30 while second torque coupling 38R is disposed between transfer shaft 240 and the right axle shaft 30. Each coupling includes a corresponding transfer clutch 46L, 46R and a clutch actuator 48L, 48R. Accordingly, independent slip control between the driven pinion shaft and each wheel 32 is provided by this arrangement. A common sump is provided with ECU 56 controlling independent actuation of both clutch actuators 48L and 48R.

Figure 11:
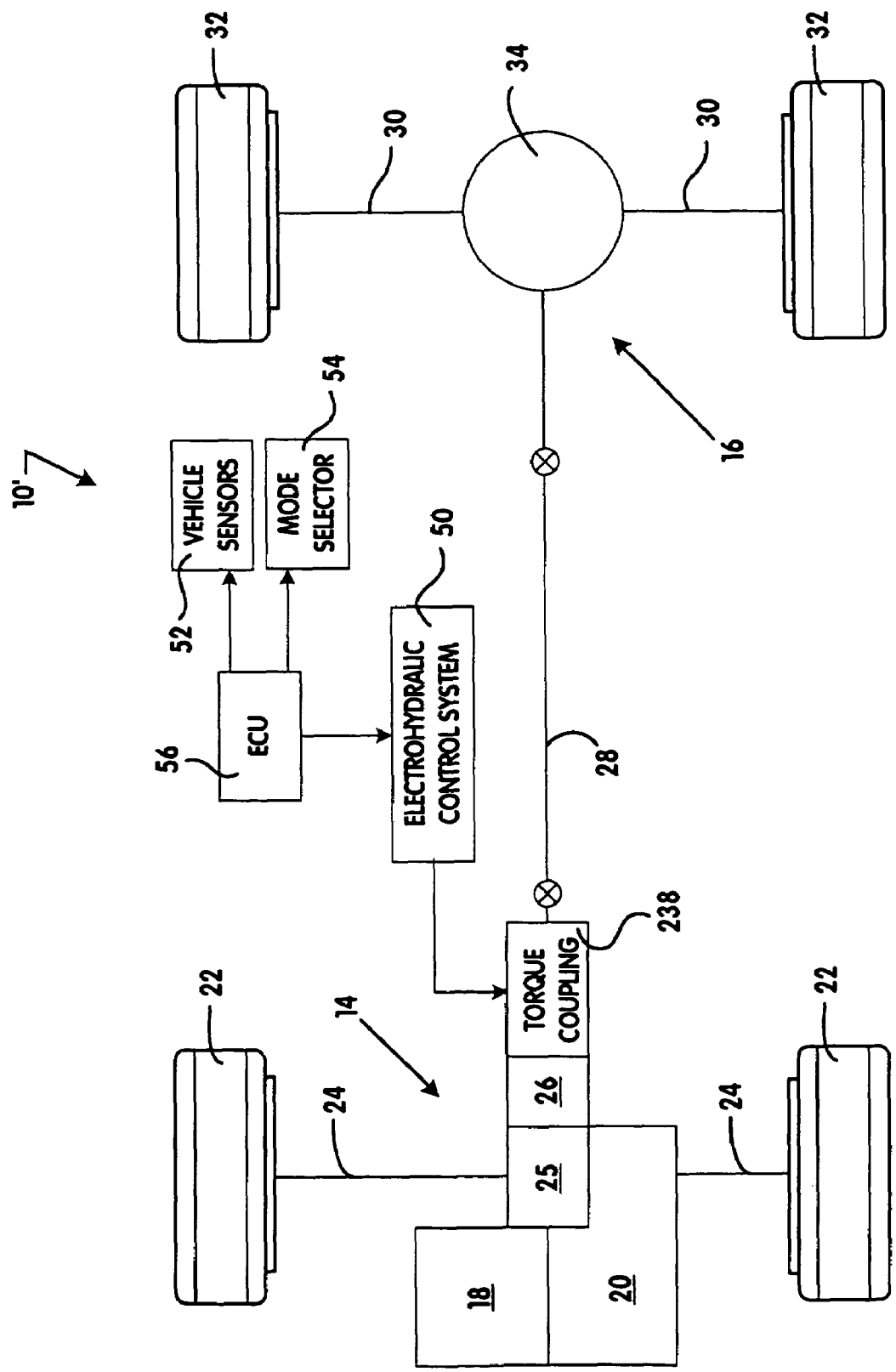
FIG. 11 illustrates an alternative drivetrain arrangement for a fourwheel drive motor vehicle equipped with another power transmission device embodying the present invention.

To illustrate an alternative power transmission device to which the present invention is applicable, FIG. 11 schematically depicts a front-wheel based four-wheel drive drivetrain layout 10' for a motor vehicle. In particular, engine 18 drives a multi-speed transaxle 20 having an integrated front differential unit 25 for driving front wheels 22 via axle shafts 24. As before, PTU 26 is also driven by transaxle 20 for delivering drive torque to the input member of a torque coupling 238. The output member of torque coupling 238 is coupled to propshaft 28 which, in turn, drives rear wheels 32 via axle assembly 34. Rear axle assembly 34 can be a traditional driven axle with a differential or, in the alternative, be similar to the arrangements described in association with FIG. 9 or 10. Accordingly, in response to the detection of a front wheel slip condition, torque coupling unit 238 is adaptively actuated to deliver drive torque "on-demand" to rear wheels 32. Again, it is contemplated that torque coupling unit 238 is substantially similar in structure and function to that of torque coupling unit 38 previously described herein.

Figure 12:
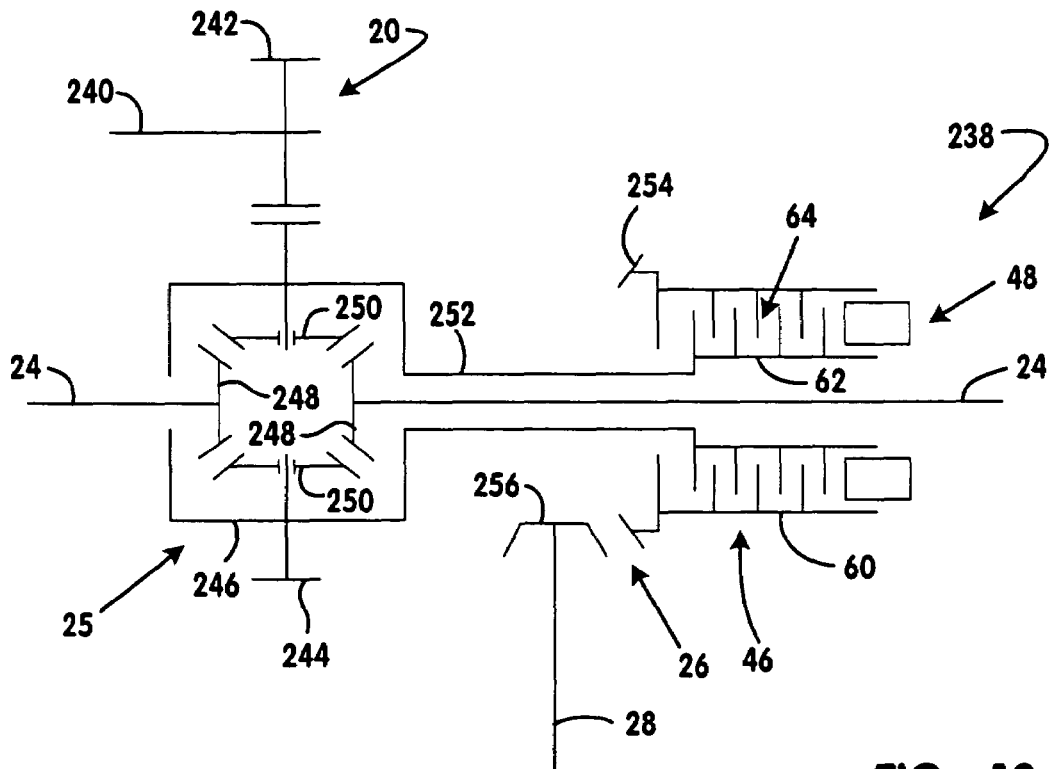
FIGS. 12 through 15 schematically illustrate different embodiments of the power transmission device shown in FIG. 11.

Referring now to FIG. 12, torque coupling 238 is schematically illustrated in association with an on-demand four-wheel drive system based on a front-whell drive vehicle similar to that shown in FIG. 11. In particular, an output shaft 240 of transaxle 20 is shown to drive an output gear 242 which, in turn, drives an input gear 244 that is fixed to a carrier 246 associated with front differential unit 25. To provide drive torque to front wheels 22, front differential unit 25 includes a pair of side gears 248 that are connected to front wheels 22 via axleshafts 24. Differential unit 25 also includes pinions 250 that are rotatably supported on pinion shafts fixed to carrier 246 and which are meshed with side gears 248. A transfer shaft 252 is provided for transferring drive torque from carrier 246 to a clutch hub 62 associated with transfer clutch 46. PTU 26 is a right-angled drive mechanism including a ring gear 254 fixed for rotation with drum 60 of transfer clutch 46 and which is meshed with a pinion gear 256 fixed for rotation with propshaft 28. According to the present invention, the components schematically shown for torque transfer mechanism 238 are understood to be similar to those previously described. In operation, the power transfer system permits drive torque to be adaptively transferred from the primary (i.e., front) driveline to the secondary (i.e., rear) driveline.

Figure 13:
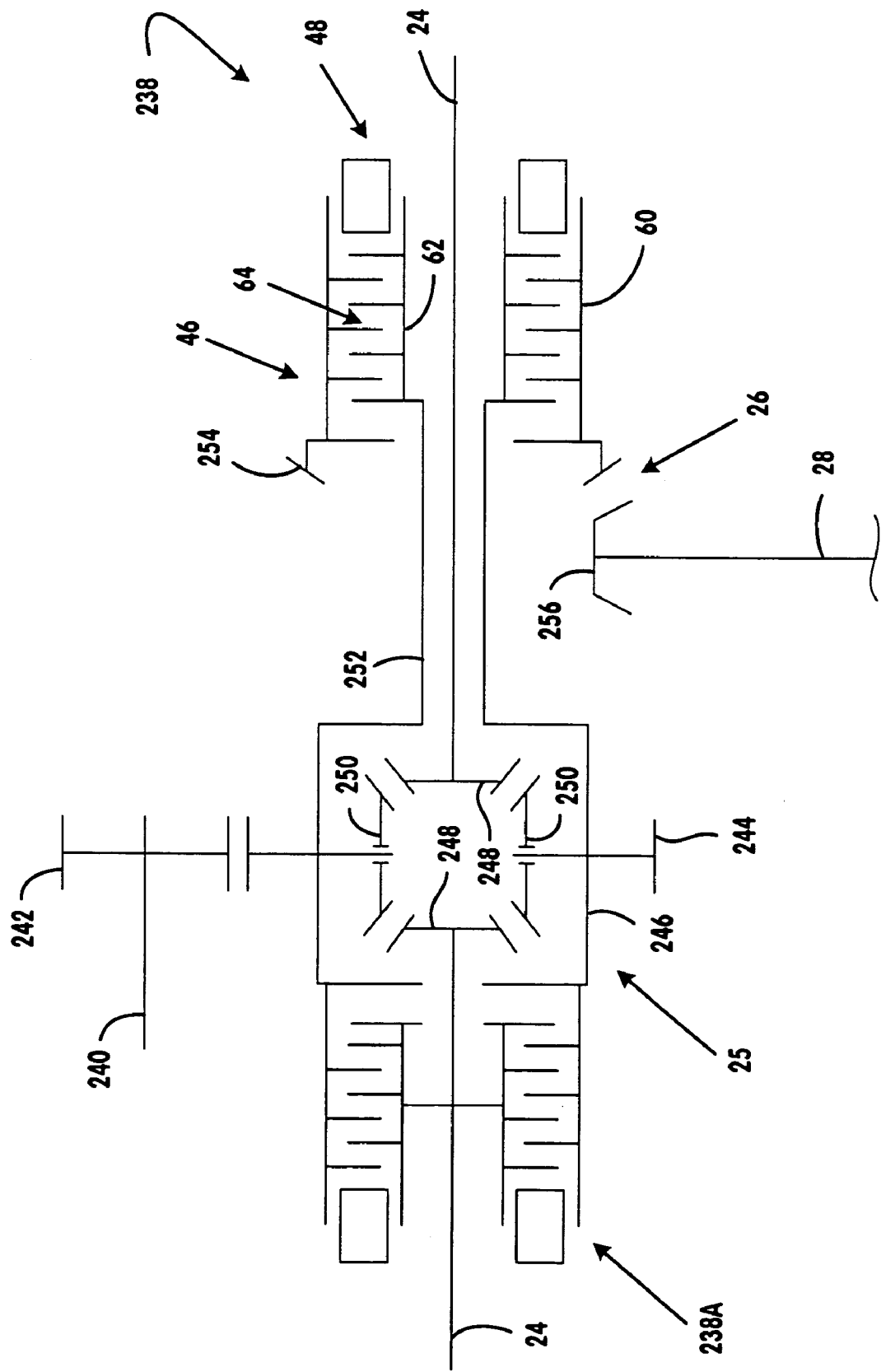

Referring to FIG. 13, a modified version of the power transmission device shown in FIG. 12 now includes a second torque coupling 238A that is arranged to provide a limited slip feature in association with primary differential 25. As before, torque coupling 238 provides on-demand transfer of drive torque from the primary driveline to the secondary driveline. In addition, second torque coupling 238A now provides on-demand torque biasing (side-to-side) between axleshafts 24 of primary driveline 14.

Figure 14:
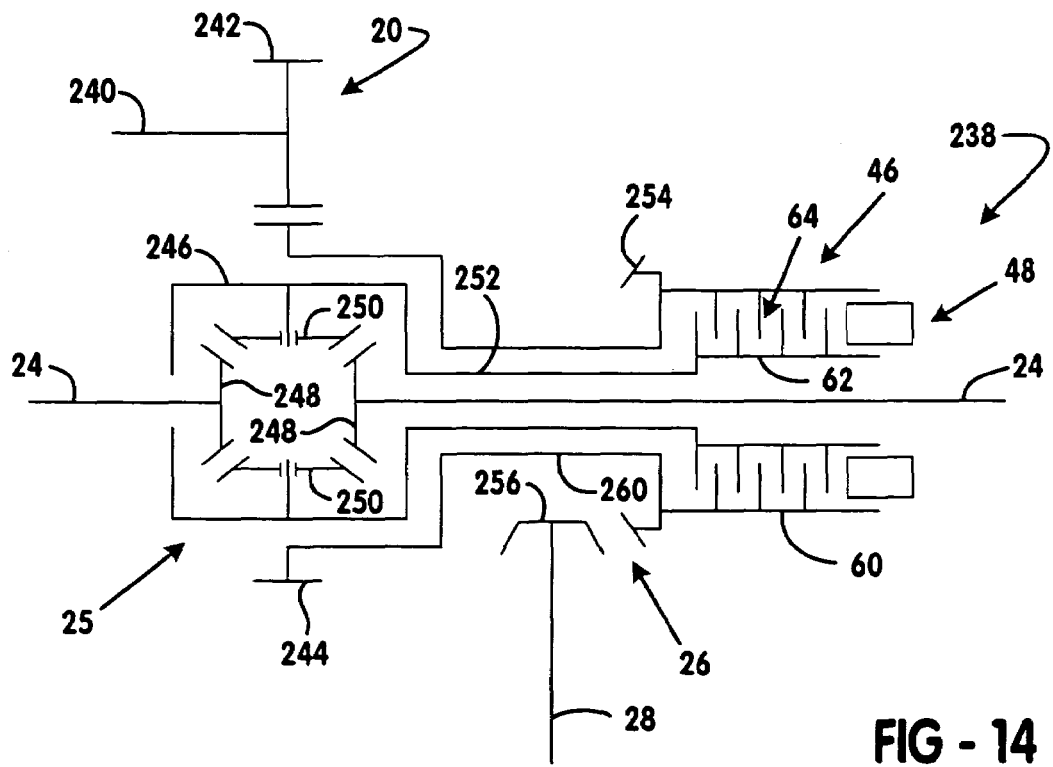

FIG. 14 illustrates another modified version of FIG. 12 wherein an on-demand four-wheel drive system is shown based on a rear-wheel drive motor vehicle that is arranged to normally deliver drive torque to rear wheels 32 while selectively transmitting drive torque to front wheels 22 through a torque coupling 238. In this arrangement, drive torque is transmitted directly from transmission output shaft 240 to power transfer unit 26 via a drive shaft 260 which interconnects input gear 244 to ring gear 254. To provide drive torque to front wheels 22, torque coupling 238 is shown operably disposed between drive shaft 260 and transfer shaft 252. In particular, transfer clutch 46 is arranged such that drum 60 is driven with ring gear 254 by drive shaft 260. As such, clutch actuator 48 can be adaptively actuated to transfer drive torque from drum 60 through clutch pack 64 to hub 62 which, in turn, drives carrier 246 of front differential unit 25 via transfer shaft 252.

Figure 15:
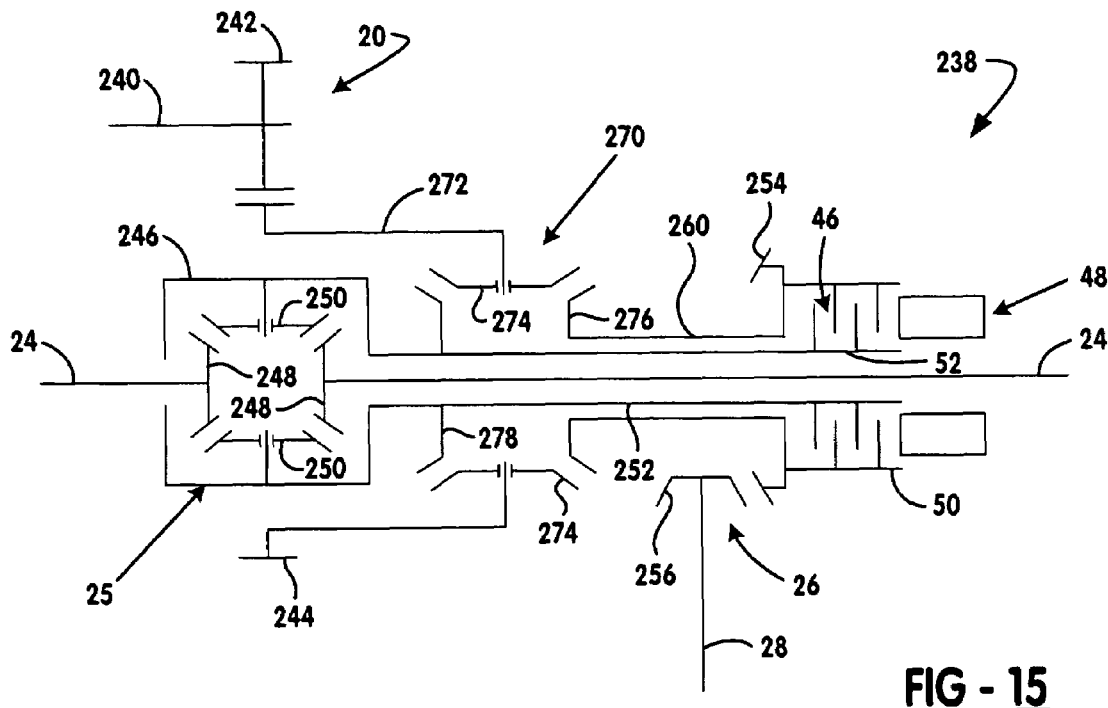

In addition to the on-demand four-wheel drive systems shown previously, the power transmission technology of the present invention can likewise be used in full-time four-wheel drive systems to adaptively bias the torque distribution transmitted by a center or "interaxle" differential unit to the front and rear drivelines. For example, FIG. 15 schematically illustrates a full-time four-wheel drive system which is generally similar to the on-demand four-wheel drive system shown in FIG. 14 with the exception that an interaxle differential unit 270 is now operably installed between carrier 246 of front differential unit 25 and transfer shaft 252. In particular, output gear 244 is fixed for rotation with a carrier 272 of interaxle differential 270 from which pinion gears 274 are rotatably supported. A first side gear 276 is meshed with pinion gears 274 and is fixed for rotation with drive shaft 260 so as to be drivingly interconnected to the rear driveline through power transfer unit 26. Likewise, a second side gear 278 is meshed with pinion gears 274 and is fixed for rotation with carrier 246 of front differential unit 25 so as to be drivingly interconnected to the front driveline. Torque transfer mechanism 238 is now shown to be operably disposed between side gears 276 and 278. Torque transfer mechanism 238 is operably arranged between the driven outputs of interaxle differential 270 for providing an adaptive torque biasing and slip limiting function.

Figure 16:
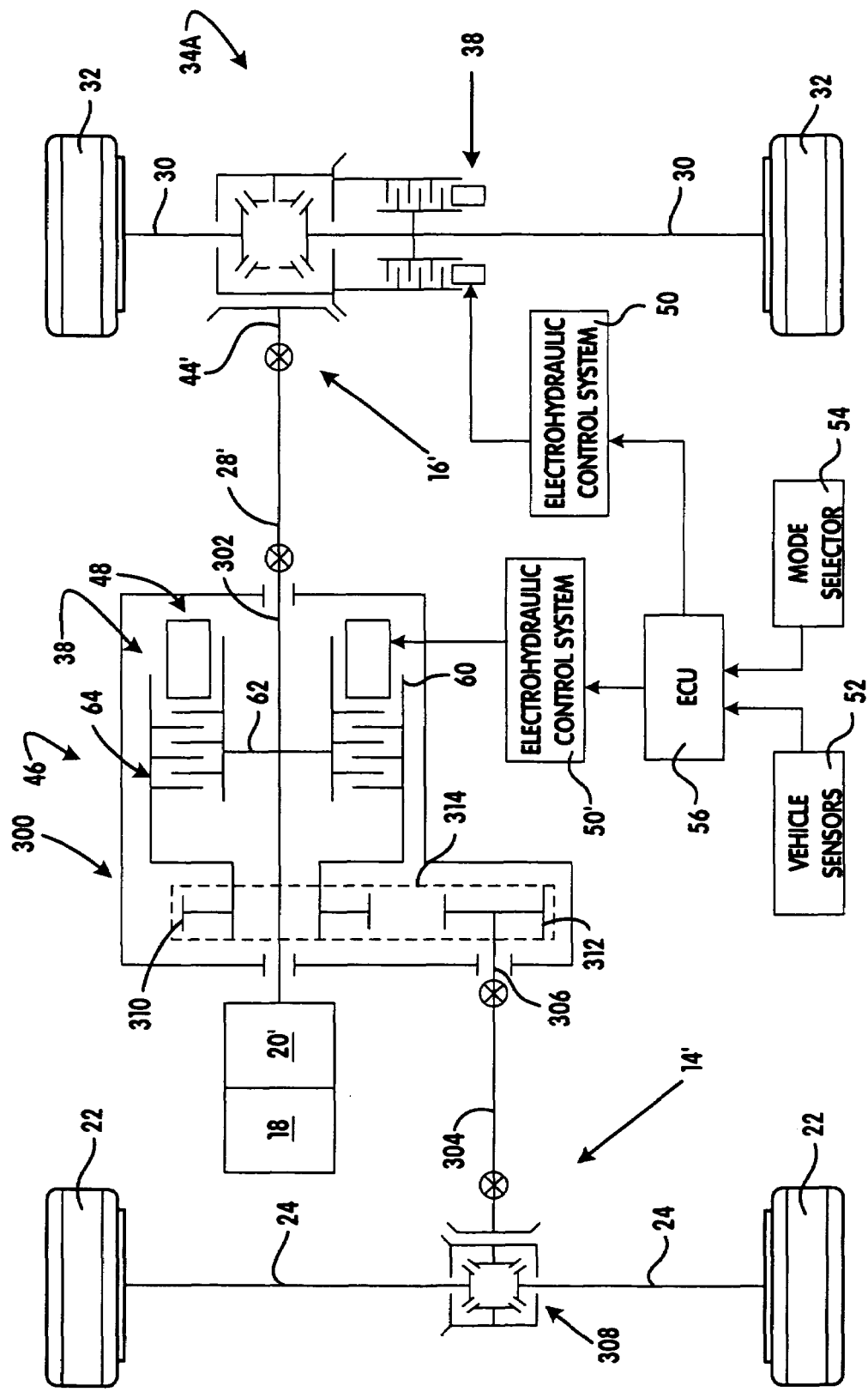
FIG. 16 is an illustration of another drivetrain arrangement for a four-wheel drive vehicle equipped with a power transmission device embodying the present invention.

Referring now to FIG. 16, a drivetrain for a four-wheel drive vehicle is shown to include engine 18, a multi-speed transmission 20' for delivering drive torque to a primary or rear driveline 16' through a power transmission device, thereinafter referred to as transfer case 300. As seen, transfer case 300 has a rear output shaft 302 interconnected between the output of transmission 20' and a rear propshaft 28'. Further, propshaft 28' is shown to drive a pinion shaft 44' for driving a drive axle assembly which, in this example, is similar to rear axle assembly 34A of FIG. 9. A secondary or front driveline 14' includes a front propshaft 304 interconnecting a front output shaft 306 of transfer case 300 to a conventional front axle assembly 308. A transfer assembly associated with transfer case 300 includes a first sprocket 310 rotatably supported on rear output shaft 302, a second sprocket 312 fixed to front output shaft 306, and a chain 314 enmeshed therebetween. Transfer case 300 is shown to include a torque coupling 38 for providing on-demand transfer of drive torque from rear output shaft 302 through the transfer assembly to first output shaft 306. As seen, transfer case 300 has an electrohydraulic control system 50' that is controlled by ECU 56 in coordination with electrohydraulic control system 50 associated with torque coupling 38 in drive axle 34A.

Figure 17:
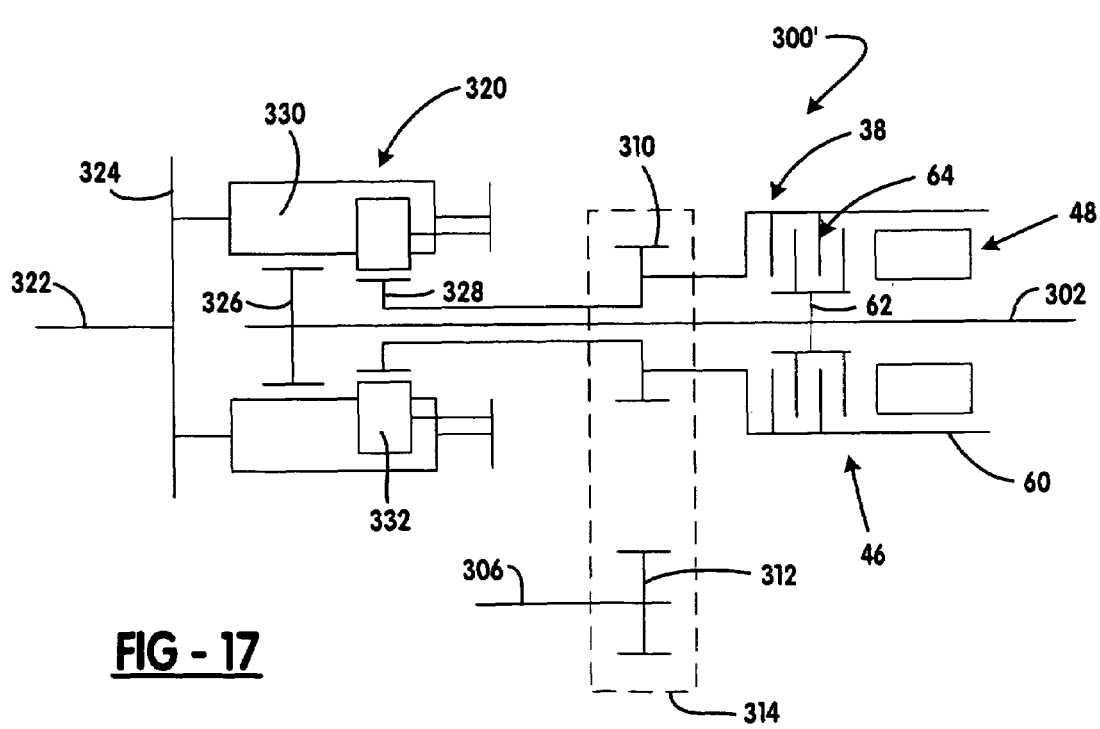
FIG. 17 is a schematic illustration of an alternative construction for the power transmission device shown in FIG. 16.

Referring now to FIG. 17, a full-time 4WD system is shown to include a transfer case 300' which is generally similar to transfer case 300 of FIG. 16 except that an interaxle differential 320 is provided between an input shaft 322 and output shafts 302 and 306. As is conventional, input shaft 322 is driven by the output of transmission 20'. Differential 320 includes an input defined as a planet carrier 324, a first output defined as a first sun gear 326, a second output defined as a second sun gear 328, and a gearset for permitting speed differentiation between first and second sun gears 326 and 328. The gearset includes a plurality of meshed pairs of first planet gears 330 and second pinions 332 which are rotatably supported by carrier 324. First planet gears 330 are shown to mesh with first sun gear 326 while second planet gears 332 are meshed with second sun gear 328. First sun gear 326 is fixed for rotation with rear output shaft 302 so as to transmit drive torque to rear driveline 16'. To transmit drive torque to front driveline 14', second sun gear 328 is coupled to the transfer assembly which again includes first sprocket 310 rotatably supported on rear output shaft 302, second sprocket 312 fixed to front output shaft 306, and power chain 314.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
 a rotary input member adapted to receive drive torque from a source of drive torque;
 a rotary output member adapted to transmit drive torque to an output device;
 a torque transmission mechanism operable for transferring drive torque from said input member to said output member, said torque transmission mechanism including a friction clutch operably disposed between said input member and said output member and a clutch actuator for controlling engagement of said friction clutch, said clutch actuator including a rotary operator and a thrust mechanism, said rotary operator having first and second components defining an actuation chamber and a return chamber therebetween, said first component being fixed for rotation with one of said input and output members and said second component adapted to rotate relative to said first component in response to a fluid pressure differential between said actuation and return chambers, said thrust mechanism operable for applying a clutch engagement force on said friction clutch in response to rotation of said second component relative to said first component; and
 a fluid control system for regulating said fluid pressure differential between said actuation and return chambers.

2. The power transmission device of claim 1 wherein said fluid control system includes a source of hydraulic fluid providing fluid to a pump and a control valve disposed in a hydraulic circuit between said pump and at least one of said actuation and return chambers.

3. The power transmission device of claim 2 wherein said fluid control system further includes a control unit operable to control actuation of said control valve for varying the magnitude of the fluid pressure supplied to said actuation chamber as a function of a rotary speed difference between said input and output members.

4. The power transmission device of claim 3 wherein said fluid control system further includes a pressure sensor which provides a signal to said control unit that is indicative of the value of the fluid pressure in said actuation chamber.

5. The power transmission device of claim 1 wherein angular movement of said second component to a low pressure position relative to said first component causes said thrust mechanism to be located in a first position for applying a minimum clutch engagement force on said friction clutch, and wherein angular movement of said second component to a high pressure position relative to said first component causes said thrust mechanism to move to a second position for applying a maximum clutch engagement force on said friction clutch, said second component is moveable between its low pressure and high pressure positions due to the magnitude of the fluid pressure delivered to at least one of said actuation chamber and said return chamber by said fluid control system.

6. The power transmission device of claim 1 wherein said first component of said rotary operator is a first ring having a first body segment and plurality of first lugs so as to define a plurality of channels therebetween, and wherein said second component of said rotary actuator is a second ring having a second body segment and a plurality of second lugs which extend into said channels so as to define an alternating series of said actuation chambers and said return chambers.

7. The power transmission device of claim 6 wherein said second ring is fixed to a drive component of said thrust mechanism such that rotation of said drive component results in translational movement of a driven component of said thrust mechanism for controlling the magnitude of said clutch engagement force applied to said friction clutch.

8. The power transmission device of claim 7 wherein said thrust mechanism is a ball ramp unit with a first cam member as its drive component, a second cam member as its driven component, and rollers engaging a cam surface formed between said first and second cam members, wherein said cam surface is configured to cause translational movement of said second cam member in response to rotary movement of said first cam member, and wherein said second cam member is arranged to cause corresponding movement of an apply plate relative to said friction clutch.

9. The power transmission device of claim 8 wherein an increase in fluid pressure in said actuation chambers and a reduction in fluid pressure in said return chambers causes said second ring and said first cam member to rotate in a first direction relative to said first ring for causing corresponding movement of said second cam member from a first position toward a second position for axially moving said apply plate from a released position toward a locked position relative to said friction clutch.

10. The power transmission device of claim 9 wherein a decrease in fluid pressure in said actuation chambers and an increase in fluid pressure in said return chambers causes said second ring and said first cam member to rotate in a second direction relative to said first ring for causing movement of said second cam member toward its first position for axially moving said apply plate toward its released position.

11. The power transmission device of claim 1 wherein said input member is a first shaft in a transfer case and said output member is a second shaft of said transfer case.

12. The power transmission device of claim 1 wherein said input member is driven by a powertrain of a motor vehicle and said output member is connected to a differential unit of a drive axle assembly.

13. The power transmission device of claim 1 defining a drive axle assembly having a differential unit interconnecting a pair of axleshafts, and wherein said input member is a differential carrier of said differential unit, said output member is one of said axleshafts, and said torque transmission unit is arranged to adaptively limit slip between said axleshafts.

14. The power transmission device of claim 1 wherein said fluid control system includes a first flow path supplying fluid from a fluid source to a fluid pump, a second flow path supplying fluid from said pump to a control valve, a third flow path connecting said control valve to said actuation chamber, and a fourth flow path connecting said control valve to said return chamber.

15. The power transfer device of claim 14 wherein said control valve is operable in a first mode to deliver pressurized fluid through said third flow path to said actuation chamber and vent fluid from said return chamber through said fourth flow path so as to cause said second component to rotate in a first direction relative to said first component from a low pressure position toward a high pressure position for causing said thrust mechanism to increase said clutch engagement force exerted on said friction clutch, and wherein said control valve is operable in a second mode to deliver pressurized fluid through said fourth flow path to said return chamber and vent fluid from said actuation chamber through said third flow path so as to cause said second component to rotate in a second direction relative to said first component toward its low pressure position for causing said thrust mechanism to decrease said clutch engagement force exerted on said friction clutch.

16. The power transmission device of claim 14 wherein said fluid control system further includes a second control valve disposed in said second flow path between said pump and said first control valve, and wherein said second control valve is selectively actuated to vary the fluid pressure supplied to said actuation chamber for controlling the angular position of said second component of said rotary operator relative to said first component.

17. The power transmission device of claim 14 wherein said fluid control system further includes a second control valve disposed in said third flow path between said first control valve and said actuation chamber, and wherein said second control valve is actuated for varying the fluid pressure supplied to said actuation chamber so as to control the angular position of said second component relative to said first component.

18. The power transmission device of claim 1 wherein said fluid control system includes a first flow path supplying fluid from a fluid source to a pump, a second flow path connecting said pump to said actuation chamber, and a third flow path connecting said pump to said return chamber, and wherein said control valve is disposed in said second path and is operable for regulating the fluid pressure within said actuation chamber so as to control the angular position of said second component relative to said first component for varying the magnitude of said clutch engagement force exerted by said thrust mechanism on said friction clutch.

19. A power transfer device for use in a motor vehicle having a powertrain and first and second drivelines, comprising:
a first shaft driven by the powertrain and adapted for connection to the first driveline;
a second shaft adapted for connection to the second driveline;
a torque transmission mechanism for transferring drive torque from said first shaft to said second shaft, said torque transmission mechanism including a friction clutch operably disposed between said first shaft and said second shaft, and a clutch actuator for engaging said friction clutch, said clutch actuator including a rotary operator and a thrust mechanism, said rotary operator having first and second components which define an actuation chamber and a return chamber, said first component being fixed for rotation with one of said first and second shafts and said second component adapted to rotate relative to said first component in response to a fluid pressure differential between said actuation and return chambers, said thrust mechanism operable for applying a clutch engagement force to said friction clutch in response to rotation of said second component relative to said first component; and a control system for regulating said fluid pressure differential between said actuation and return chambers.

20. The power transmission device of claim 19 wherein said control system includes a source of hydraulic fluid providing fluid to a pump and a control valve disposed in a hydraulic circuit between said pump and at least one of said actuation and return chambers.

21. The power transfer device of claim 20 wherein said control system further includes a control unit is operable to control actuation of said control valve for adaptively varying the magnitude of the fluid pressure supplied to said actuation chamber as a function of a rotary speed difference between said first and second shafts.

22. The power transfer device of claim 21 wherein said control system further includes a pressure sensor which provides a signal to said control unit that is indicative of the value of the fluid pressure in said actuation chamber.

23. The power transfer device of claim 19 wherein angular movement of said second component to a low pressure position relative to said first component causes said thrust mechanism to be located in a first position for applying a minimum clutch engagement force on said friction clutch, wherein angular movement of said second component to a high pressure position relative to said first component causes said thrust mechanism to move to a second position for applying a maximum clutch engagement force on said friction clutch, and wherein said second component is moveable between its low pressure and high pressure positions due to the magnitude of said fluid pressure differential between said actuation and return chambers.

24. The power transfer device of claim 19 wherein said first component of said rotary operator is a first ring having a first body segment and a plurality of radially extending first lugs which define a series of channels therebetween, wherein said second component is a second ring having a second body segment and a plurality of radially extending second lugs which extend into said channels so as to define a plurality of said actuation chambers and return chambers, wherein said actuator chambers are in fluid communication with an outlet of a control valve, and wherein a fluid pump is operable to draw fluid from a fluid source and deliver high pressure fluid to said control valve such that selective control of said control valve results in rotary movement of said second ring relative to said first ring.

25. The power transfer device of claim 24 wherein said second ring is fixed to a drive component of said thrust mechanism such that rotation of said drive component results in translational movement of a driven component of said thrust mechanism for exerting said clutch engagement force on said friction clutch.

26. The power transfer device of claim 25 wherein said thrust mechanism is a ball ramp unit with a first cam member as its drive component, a second cam member as its driven component, and rollers engage a cam surface formed between said first and second cam member, and wherein said cam surface is configured to cause translational movement of said second cam member in response to rotary movement of said first cam member for applying said clutch engagement force to said friction clutch.

27. The power transfer device of claim 20 wherein said hydraulic circuit includes a first flow path supplying fluid from said fluid source to said pump, a second flow path supplying fluid from said pump to said control valve, a third flow path connecting said control valve to said actuation chamber and a fourth flow path connecting said control valve to said return chamber.

28. The power transfer device of claim 27 wherein said control valve is operable in a first mode to deliver pressurized fluid through said third flow path to said actuation chamber and vent fluid from said return chamber through said fourth flow path so as to cause said second component to rotate in a first direction relative to said first component from a low pressure position toward a high pressure position for causing said thrust mechanism to increase the clutch engagement force exerted on said friction clutch, and wherein said control valve is operable in a second mode to deliver pressurized fluid through said fourth flow path to said return chamber and vent fluid from said actuation chamber through said third flow path so as to cause said second component to rotate in a second direction relative to said first component toward its low pressure position for causing said thrust mechanism to decrease the clutch engagement force exerted on said friction clutch.

29. The power transfer device of claim 27 wherein said control system further includes a second control valve disposed in said second flow path between said pump and said first control valve, and wherein said second control valve is selectively actuated to vary the fluid pressure supplied to said actuation chamber for controlling the angular position of said second component of said rotary operator relative to said first component.

30. The power transfer device of claim 27 wherein said control system further includes a second control valve disposed in said third flow path between said first control valve and said actuation chamber, and wherein said second control valve is actuated for varying the fluid pressure supplied to said actuation chamber so as to control the angular position of said second component relative to said first component.

31. The power transfer device of claim 20 wherein said hydraulic circuit includes a first flow path supplying fluid from a fluid source to said pump, a second flow path connecting said pump to said actuation chamber, and a third flow path connecting said pump to said return chamber, and wherein said control valve is disposed in said second path and is operable for regulating the fluid pressure within said actuation chamber so as to control the angular position of said second component relative to said first component of said rotary actuator for varying the magnitude of said clutch engagement force exerted by said thrust mechanism on said friction clutch.

32. A torque transmission mechanism for use in a motor vehicle having a powertrain and a driveline, comprising:
an input member driven by the powertrain;
an output member driving the driveline;
a clutch pack operably disposed between said input and output members;
an apply plate moveable relative to said clutch pack between a first position and a second position, said apply plate is operable in its first position to apply a minimum clutch engagement force on said clutch pack and said apply plate is operable in its second position to apply a maximum clutch engagement force on said clutch pack;
a clutch actuator for controlling movement of said apply plate between its first and second positions, said clutch actuator including a rotary actuator having first and second components that are coaxially arranged to define a first chamber and a second chamber therebetween, said first component of said rotary operator is fixed for rotation with one of said input and output members and said second component is adapted to rotate relative to said first component in response to a fluid pressure differential between said first and second chambers, and said apply plate is operable to move between its first and second positions in response to rotation of said second component relative to said first component; and a control system including a control valve disposed in a hydraulic circuit between said first and second chambers and a control unit for controlling actuation of said control valve for regulating said fluid pressure differential between said first and second chambers.

33. The power transmission device of claim 32 wherein said control unit is operable to vary the magnitude of the fluid pressure supplied to one of said first and second chambers as a function of a rotary speed difference between said input and output members.

34. The torque transmission unit of claim 33 wherein angular movement of said second component to a first position relative to said first component causes said apply plate to move to its first position, wherein angular movement of said second component to a second position relative to said first component causes said apply plate to move to its second position, and wherein angular movement of said second component from its first position toward its second position is caused by an increase in the fluid pressure delivered by said control valve to said first chamber.

35. The torque transmission unit of claim 33 wherein said first component of said rotary operator is a first ring having a first body segment and plurality of first lugs so as to define a plurality of channels therebetween, and wherein said second component of said rotary actuator is a second ring having a second body segment and a plurality of second lugs which extend into said channels so as to define an alternating series of first and second chambers between adjacent pairs of said first lugs.

36. The torque transmission unit of claim 35 wherein said second ring is fixed to a drive component of a thrust mechanism such that rotation of said drive component results in translational movement of a driven component of said thrust mechanism for controlling the magnitude of said clutch engagement force applied by said apply plate to said friction clutch.

37. The torque transmission unit of claim 36 wherein said thrust mechanism is a ball ramp unit with a first cam member as its drive component, a second cam member as its driven component, and rollers engaging a cam surface between said first and second cam members, wherein said cam surface is configured to cause translational movement of said second cam member in response to rotary movement of said first cam member, and wherein said second cam member is arranged to cause corresponding translational movement of said apply plate relative to said friction clutch.

38. The torque transmission unit of claim 37 wherein an increase in fluid pressure in said first chambers and a reduction in fluid pressure in said second chambers causes said second ring and said first cam member to rotate in a first direction relative to said first ring for causing said second cam member to axially move said apply plate from its first position toward its second position relative to said friction clutch, and wherein a decrease in fluid pressure in said first chambers and an increase in fluid pressure in said second chambers causes said second ring and said first cam member to rotate in a second direction relative to said first ring for causing said second cam member to axially move said apply plate toward its first position.

39. The torque transmission unit of claim 32 wherein said hydraulic circuit includes a first flow path supplying fluid from a fluid source to a pump, a second flow path supplying fluid from said pump to said control valve, a third flow path connecting said control valve to said first chamber, and a fourth flow path connecting said control valve to said second chamber.

40. The torque transmission unit of claim 39 wherein said control system further includes a second control valve disposed in said second flow path between said pump and said first control valve, and wherein said second control valve is selectively actuated by said control unit to vary the fluid pressure supplied to said first chamber for controlling the angular position of said second component of said rotary operator relative to said first component.

41. The torque transmission unit of claim 39 wherein said control system further includes a second control valve disposed in said third flow path between said first control valve and said first chamber, and wherein said second control valve is actuated by said control unit for varying the fluid pressure supplied to said first chamber so as to control the angular position of said second component relative to said first component.

42. The torque transmission unit of claim 32 wherein said hydraulic circuit includes a first flow path supplying fluid from a fluid source to a pump, a second flow path connecting said pump to said first chamber, and a third flow path connecting said pump to said second chamber, and wherein said control valve is disposed in said second path and is operable for regulating the fluid pressure within said first chamber so as to control the angular position of said second component relative to said first component for varying the magnitude of clutch engagement force exerted on said friction clutch.

* * * * *